United States Patent
Kitanohara et al.

(10) Patent No.: US 10,040,965 B2
(45) Date of Patent: Aug. 7, 2018

(54) CLEAR COATING COMPOSITION

(71) Applicants: OSAKA ORGANIC CHEMICAL INDUSTRY LTD., Osaka-shi, Osaka (JP); HONDA MOTOR CO., LTD., Tokyo (JP)

(72) Inventors: Mitsuko Kitanohara, Kashiwara (JP); Kazuyoshi Matsuoka, Kashiwara (JP); Yoshiyuki Saruwatari, Kashiwara (JP); Keisuke Kojima, Wako (JP); Masuo Kondo, Wako (JP)

(73) Assignees: OSAKA ORGANIC CHEMICAL INDUSTRY LTD., Osaka-shi (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/037,959

(22) PCT Filed: Nov. 19, 2014

(86) PCT No.: PCT/JP2014/080690
§ 371 (c)(1),
(2) Date: May 19, 2016

(87) PCT Pub. No.: WO2015/076314
PCT Pub. Date: May 28, 2015

(65) Prior Publication Data
US 2016/0297984 A1    Oct. 13, 2016

(30) Foreign Application Priority Data

Nov. 20, 2013  (JP) .................................. 2013-239700
Dec. 25, 2013  (JP) .................................. 2013-266568

(51) Int. Cl.
| | |
|---|---|
| *C09D 7/40* | (2018.01) |
| *C09D 133/06* | (2006.01) |
| *C09D 175/04* | (2006.01) |
| *C09D 125/14* | (2006.01) |
| *C08G 18/62* | (2006.01) |
| *C08K 3/22* | (2006.01) |
| *C08F 220/20* | (2006.01) |
| *C08F 220/18* | (2006.01) |

(52) U.S. Cl.
CPC ..... *C09D 133/066* (2013.01); *C08G 18/6229* (2013.01); *C08G 18/6254* (2013.01); *C09D 7/40* (2018.01); *C09D 125/14* (2013.01); *C09D 175/04* (2013.01); *C08F 220/20* (2013.01); *C08F 2220/185* (2013.01); *C08F 2220/1825* (2013.01); *C08K 3/22* (2013.01)

(58) Field of Classification Search
CPC .... C09D 7/12; C09D 133/066; C09D 175/04; C09D 125/14; C09D 7/40; C08G 18/6229; C08G 18/6254; C08K 3/22; C08F 2220/185; C08F 2220/1825; C08F 220/20

USPC ........................................................ 524/413
See application file for complete search history.

(56) References Cited

U.S. PATENT DOCUMENTS

| | | | |
|---|---|---|---|
| 5,597,874 A | 1/1997 | Anton et al. | |
| 5,629,372 A | 5/1997 | Anton et al. | |
| 5,914,384 A | 6/1999 | Anton et al. | |
| 6,410,206 B1 | 6/2002 | Ueda et al. | |
| 2002/0172873 A1 | 11/2002 | Ueda et al. | |
| 2005/0287354 A1 | 12/2005 | Jennings et al. | |
| 2011/0236673 A1 | 9/2011 | Jennings et al. | |
| 2012/0082854 A1 | 4/2012 | Soucek et al. | |
| 2012/0083551 A1 | 4/2012 | Soucek et al. | |
| 2012/0083568 A1 | 4/2012 | Soucek et al. | |
| 2012/0201965 A1 | 8/2012 | Soucek | |

FOREIGN PATENT DOCUMENTS

| | | |
|---|---|---|
| CN | 1125103 C | 10/2003 |
| CN | 102134296 A | 7/2011 |
| JP | 61-145260 A | 7/1986 |
| JP | 04-252282 A | 9/1992 |
| JP | 05-255635 A | 10/1993 |
| JP | 05-302057 A | 11/1993 |
| JP | 06-049368 A | 2/1994 |
| JP | 10-5679 A | 1/1998 |
| JP | 10-219189 A | 8/1998 |

(Continued)

OTHER PUBLICATIONS

Notification of Reasons for Refusal dated Aug. 2, 2016, issued in counterpart Japanese Application No. 2014-235083, with machine translation. (6 pages).
Notification of Reasons for Refusal dated Aug. 9, 2016, issued in counterpart Japanese Application No. 2014-235098, with machine translation. (6 pages).
Notification of Reasons for Refusal dated Mar. 17, 2017, issued in counterpart Japanese Application No. 2014-235083, with machine translation. (4 pages).

(Continued)

*Primary Examiner* — Angela C Scott
(74) *Attorney, Agent, or Firm* — Westerman, Hattori, Danniels & Adrian, LLP

(57) ABSTRACT

Provided are a clear coating composition which is used for top coats, the composition containing a crosslinking agent and a functional group-containing (meth)acrylate polymer formed by polymerization of a monomer component that includes an aromatic ring-containing (meth)acrylate and a functional group-containing monomer. Also provided is a clear coat composition which is used for top coats, the composition containing a crosslinking agent and a functional group-containing (meth)acrylate polymer formed by polymerization of a monomer component that includes a functional group-containing monomer and a fluorine atom-containing monomer. This clear coat composition has low colorability, has a high refractive index without the use of a filler, provides excellent glossy even when a filler is used, and can be applied to a thick film.

5 Claims, No Drawings

(56) References Cited

FOREIGN PATENT DOCUMENTS

| | | |
|---|---|---|
| JP | 10-298492 A | 11/1998 |
| JP | 11-292930 A | 10/1999 |
| JP | 11-513734 A | 11/1999 |
| JP | 11-513735 A | 11/1999 |
| JP | 2000-248024 A | 9/2000 |
| JP | 2001-524559 A | 12/2001 |
| JP | 2003-026889 A | 1/2003 |
| JP | 2003-064296 A | 3/2003 |
| JP | 2004-10726 A | 1/2004 |
| JP | 2006-251009 A | 9/2006 |
| JP | 2007-119572 A | 5/2007 |
| JP | 2007-171767 A | 7/2007 |
| JP | 2008-502479 A | 1/2008 |
| JP | 2012-177111 A | 9/2012 |
| WO | 2012/106599 A1 | 8/2012 |

OTHER PUBLICATIONS

Notification of Reasons for Refusal dated Mar. 14, 2017, issued in counterpart Japanese Application No. 2014-235098, with machine translation. (4 pages).

International Search Report dated Feb. 17, 2015, issued in counterpart International Application No. PCT/JP2014/080690 (5 pages).

Office Action dated Feb. 26, 2018, issued in counterpart Chinese Application No. 201480062940.1, with English translation (18 pages).

CLEAR COATING COMPOSITION

TECHNICAL FIELD

The present invention relates to a clear coating composition. More particularly, the present invention relates to a clear coating composition which can be suitably used, for example, for an article to be coated such as an outer plate of a body of a motor vehicle such as a passenger car, a truck, a motorcycle or a bus, a part of a motor vehicle, an electronic device, a mobile phone, and an outer plate of a household electric appliance such as an audio device, and among them, an article to be coated, such as an outer plate of a body of a motor vehicle and a part of a motor vehicle.

BACKGROUND ART

As a resin composition for a paint which forms a coating film which has a high refractive index and is excellent in heat resistance, heat aging resistance and mechanical properties, and further excellent in chemical resistance, solvent resistance and adhesive property to a substrate, there has been proposed a resin composition for a paint composed of a graft-modified cyclic olefin-based polymer obtained by graft-polymerizing hydroxyl group-containing unsaturated compound to a cyclic olefin-based polymer and a curing agent (for example, see Patent Document 1). In addition, it has been proposed that a colored base paint (A), a clear paint (B) and a clear paint (C) are used as a paint to be used in a coating film forming method for forming a coating film which is excellent in deep feel, smoothness and image clarity so as to have a refractive index of a cured coating film of the clear paint (B) which is greater by 0.02 or more than the refractive index of the cured coating film of the clear paint (C) (for example, see Patent Document 2).

In general, a filler such as metal oxide particles has been added to a paint which is used as a raw material of a coating film in order to increase a refractive index of the coating film. However, when the filler is added to the paint, not only transparency of a coating film to be formed decreases but also it is difficult to thicken a coating film since it is concerned that the filler aggregates with one another and to uniformly disperse the filler in the paint since the filler settles down in the paint with the passage of time.

Therefore, in recent years, it has been eagerly desired to develop a clear coating composition which exhibits low colorability, has a high refractive index without use of a filler, exhibits excellent glossy feel even in the case of using a filler, and can be coated into a thick film.

In addition, a clear coating composition has been used, for example, as a paint to be used for an outer plate of a body of a motor vehicle. As a clear coating composition which is resistant to scratch and corrosion and has a long shelf life, an acid epoxy-based clear coating composition containing a polyepoxide, a polycarboxylic acid having a plurality of carboxyl groups and a polyisocyanate has been proposed (for example, see Patent Document 3). However, the acid epoxy-based clear coating composition has a disadvantage of being inferior in deep feel although the composition is excellent in transparency.

As a clear coating composition which exhibits favorable storage stability and corrosion resistance, other than the acid epoxy-based clear coating composition, there has been proposed a polyurethane-based coating composition containing a polyurethane prepolymer and polyphosphoric acid as a desiccant (for example, see Patent Document 4). However, the polyurethane-based coating composition has a disadvantage of being inferior in deep feel although the coating composition is excellent in transparency as well as the acid epoxy-based clear coating composition.

Hence, in recent years, it has been eagerly desired to develop a clear coating composition to form a coating film which is excellent in transparency and deep feel, which is hard, and which is excellent in durability.

PRIOR ART DOCUMENTS

Patent Document(s)

Patent Document 1: Japanese Unexamined Patent Publication No. Hei 05-302057
Patent Document 2: Japanese Unexamined Patent Publication No. Hei 10-05679
Patent Document 3: Japanese Unexamined Patent Publication No. Hei 10-298492
Patent Document 4: Japanese Unexamined Patent Publication No. Hei 10-219189

SUMMARY OF THE INVENTION

Problem to be Solved by the Invention

The present invention has been made in view of the prior art, and an object of the present invention is to provide a clear coating composition which has a high refractive index without use of a filler, and imparts glossy feel, image clarity and change in color even in the case of using a filler.

In addition, an object of the present invention is to provide a clear coating composition to form a coating film which is excellent in transparency and deep feel, which is hard, and which is excellent in durability.

Means for Solving Problem

The first aspect of the present invention relates to a clear coating composition used for a top coat, in which the clear coating composition includes a functional group-containing (meth)acrylate-based polymer made by the polymerization of a monomer component containing an aromatic ring-containing (meth)acrylate and a functional group-containing monomer represented by the formula (I):

[Chem. 1]

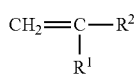
(I)

wherein $R^1$ represents hydrogen atom or methyl group, $R^2$ represents hydroxyl group, an alkyl group of 1 to 4 carbon atoms having hydroxyl group, carboxyl group, an alkyl group of 1 to 4 carbon atoms having carboxyl group, epoxy group, an alkyl group of 1 to 4 carbon atoms having epoxy group, a hydroxyalkyloxycarbonyl group having a hydroxyalkyl group of 1 to 4 carbon atoms or a group represented by the formula:

[Chem. 2]

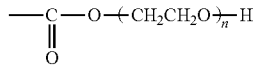

wherein n represents an integer of 3 to 20, and a crosslinking agent.

The second aspect of the present invention relates to a clear coating composition used for a top coat, in which the clear coating composition includes (A) a functional group-containing (meth)acrylate-based polymer made by the polymerization of a monomer component containing a functional group-containing monomer represented by the formula (I):

[Chem. 3]

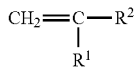
(I)

wherein $R^1$ represents hydrogen atom or methyl group, and $R^2$ represents hydroxyl group, an alkyl group of 1 to 4 carbon atoms having hydroxyl group, carboxyl group, an alkyl group of 1 to 4 carbon atoms having carboxyl group, epoxy group, an alkyl group of 1 to 4 carbon atoms having epoxy group, a hydroxyalkyloxycarbonyl group having a hydroxyalkyl group of 1 to 4 carbon atoms or a group represented by the formula:

[Chem. 4]

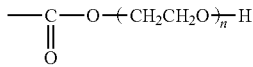

wherein, n represents an integer of 3 to 20, and a fluorine atom-containing monomer represented by the formula (II):

[Chem. 5]

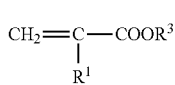
(II)

wherein $R^1$ is the same as mentioned above, and $R^3$ represents an alkyl group of 1 to 12 carbon atoms having 3 to 8 fluorine atoms, and (B) a crosslinking agent.

Effect of the Invention

The clear coating composition of the first aspect of the present invention shows excellent effects such that the clear coating composition enables to form a thick coating film which is low in colorability, has high refractive index without use of a filler, and is excellent in glossy feel even in the case of using a filler.

The clear coating composition of the second aspect of the present invention shows excellent effects such that the clear coating composition enables to form a hard coating film which is excellent in transparency and deep feel, and having high durability.

MODES FOR CARRYING OUT THE INVENTION

First Aspect of the Present Invention

As described above, the clear coating composition of the first aspect of the present invention is a clear coating composition used for a top coat and contains a functional group-containing (meth)acrylate-based polymer made by the polymerization of a monomer component containing an aromatic ring-containing (meth)acrylate and a functional group-containing monomer represented by the formula (I):

[Chem. 6]

wherein $R^1$ represents hydrogen atom or methyl group, and $R^2$ represents hydroxyl group, an alkyl group of 1 to 4 carbon atoms having hydroxyl group, carboxyl group, an alkyl group of 1 to 4 carbon atoms having carboxyl group, epoxy group, an alkyl group of 1 to 4 carbon atoms having epoxy group, a hydroxyalkyloxycarbonyl group having a hydroxyalkyl group of 1 to 4 carbon atoms, or a group represented by the formula:

[Chem. 7]

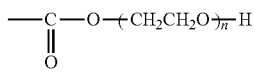

wherein n represents an integer of 3 to 20, and a crosslinking agent.

Incidentally, in the present invention, the term "(meth)acrylate" means an acrylate or a methacrylate, and the acrylate and the methacrylate can be used singly or in combination. In addition, the term "(meth)acrylic acid" means acrylic acid or methacrylic acid, and acrylic acid and methacrylic acid can be used singly or in combination.

Examples of the aromatic ring-containing (meth)acrylate include, for example, an aryl (meth)acrylate, an aralkyl (meth)acrylate and the like, and the present invention is not limited only to those exemplified ones. Incidentally, the aryl group of the aryl(meth)acrylate and the aralkyl group of the aralkyl (meth)acrylate may have a substituent within a scope which would not impair an object of the present invention.

Examples of the aryl group of the aryl (meth)acrylate include, for example, an aryl group having preferably 6 to 30 carbon atoms, more preferably 6 to 18 carbon atoms, and further preferably 6 to 12 carbon atoms, such as phenyl group, tolyl group, xylyl group, biphenyl group, naphthyl group, anthranyl group or phenanthryl group, and the present invention is not limited only to those exemplified ones.

Examples of the aralkyl group of the aralkyl (meth)acrylate include, for example, an aralkyl group having preferably 7 to 30 carbon atoms, more preferably 7 to 18 carbon atoms, and further preferably 7 to 12 carbon atoms, such as benzyl group, phenylethyl group, methylbenzyl group or naphthylmethyl group, and the present invention is not limited only to those exemplified ones.

The aromatic ring-containing (meth)acrylate is preferably an aromatic ring-containing (meth)acrylate having a refractive index of 1.50 or more from the viewpoint of obtaining a clear coating composition which exhibits low colorability, has a high refractive index without use of a filler, exhibits excellent glossy feel even in the case of using a filler, and can be coated into a thick film.

Examples of the aromatic ring-containing (meth)acrylate having a refractive index of 1.50 or more include, for example, benzyl (meth)acrylate, naphthyl (meth)acrylate, anthranyl (meth)acrylate, phenanthryl (meth)acrylate, 2-(naphthoxycarbonylamino)ethyl (meth)acrylate, phenoxyethyl (meth)acrylate, 2-hydroxy-3-phenoxypropyl (meth)acrylate, phenoxydiethylene glycol (meth)acrylate, o-phenylphenoxyethyl (meth)acrylate, 2-(meth)acryloyloxyethyl-2-hydroxyethyl phthalate, 2,2-bis[4-(meth)acryloyloxyethoxyphenyl]propane, 2,2-bis[4-(meth)acryloyloxydiethoxyphenyl]propane, 2,2-bis[4-(meth)acryloyloxypolyethoxyphenyl]propane, 2,2-bis[4-(meth)acryloyloxydiethoxyphenyl]propane, 1-(meth)acryloyloxy-2,4,6-tribromobenzene, 1-(meth)acryloylethoxy-2,4,6-tribromobenzene, p-cumylphenolethylene oxide-modified (meth)acrylate, nonylphenolethylene oxide-modified (meth)acrylate, benzyl chloride salt of N,N-dimethylaminoethyl (meth)acrylate, benzyl chloride salt of N,N-diethylaminoethyl (meth)acrylate, benzyl chloride salt of N,N-dimethylaminopropyl (meth)acrylate, benzyl chloride salt of N,N-diethylaminopropyl (meth)acrylate, p-toluenesulfonic acid alkyl (number of carbon atoms of an alkyl group: 1 to 18) salt of N,N-dimethylaminoethyl (meth)acrylate, p-toluenesulfonic acid alkyl (number of carbon atoms of an alkyl group: 1 to 18) salt of N,N-diethylaminoethyl (meth)acrylate, p-toluenesulfonic acid alkyl (number of carbon atoms of an alkyl group: 1 to 18) salt of N,N-dimethylaminopropyl (meth)acrylate, p-toluenesulfonic acid alkyl (number of carbon atoms of an alkyl group: 1 to 18) salt of N,N-diethylaminopropyl (meth)acrylate, and a phthalic anhydride adduct of hydroxyl group-containing (meth)acrylate, such as 2-hydroxyethyl (meth)acrylate, 2-hydroxypropyl (meth)acrylate or 4-hydroxybutyl (meth)acrylate, and the present invention is not limited only to those exemplified ones. These aromatic ring-containing (meth)acrylates can be used singly or two or more kinds thereof can be used in combination.

Among the aromatic ring-containing (meth)acrylates, benzyl (meth)acrylate, naphthalene (meth)acrylate, anthranyl (meth)acrylate, phenanthryl (meth)acrylate and naphthalene-containing urethane-modified methacrylate are preferable, and benzyl (meth)acrylate, anthranyl (meth)acrylate and 2-(naphthoxycarbonylamino)ethyl (meth)acrylate are more preferable. These aromatic ring-containing (meth)acrylates can be used singly or two or more kinds thereof can be used in combination.

In the monomer component used in the present invention, a functional group-containing monomer represented by the formula (I):

[Chem. 8]
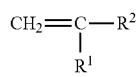
(I)

wherein $R^1$ represents hydrogen atom or methyl group, and $R^2$ represents hydroxyl group, an alkyl group of 1 to 4 carbon atoms having hydroxyl group, carboxyl group, an alkyl group of 1 to 4 carbon atoms having carboxyl group, epoxy group, an alkyl group of 1 to 4 carbon atoms having epoxy group, a hydroxyalkyloxycarbonyl group having a hydroxyalkyl group of 1 to 4 carbon atoms, or a group represented by the formula:

[Chem. 9]
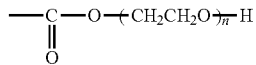

wherein n represents an integer of 3 to 20 is used together with the aromatic ring-containing (meth)acrylate.

The functional group-containing monomer is used in order to introduce a functional group into a polymer to be obtained. Examples of the functional group of the functional group-containing monomer include hydroxyl group, carboxyl group and epoxy group. These functional groups can be used singly in one molecule, or a plurality of the same or different functional groups can be present in one molecule.

In the functional group-containing monomer represented by the formula (I), $R^1$ represents hydrogen atom or methyl group. In addition, $R^2$ represents hydroxyl group, an alkyl group of 1 to 4 carbon atoms having hydroxyl group, carboxyl group, an alkyl group of 1 to 4 carbon atoms having carboxyl group, epoxy group, an alkyl group of 1 to 4 carbon atoms having epoxy group, a hydroxyalkyloxycarbonyl group having a hydroxyalkyl group of 1 to 4 carbon atoms, or a group represented by the formula:

[Chem. 10]
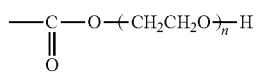

wherein n represents an integer of 3 to 20. Examples of the alkyl group having 1 to 4 carbon atoms include, for example, methyl group, ethyl group, n-propyl group, isopropyl group, n-butyl group, isobutyl group, tert-butyl group, and the like.

Examples of the functional group-containing monomer represented by the formula (I) include, for example, vinyl alcohol, (meth)allyl alcohol, hydroxymethyl (meth)acrylate, hydroxyethyl (meth)acrylate, hydroxypropyl (meth)acrylate, hydroxybutyl (meth)acrylate, (meth)acrylic acid, allyl carboxylate, glycidyl (meth)acrylate, and polyethylene glycol mono(meth)acrylate in which the number of moles of ethylene oxide group added is 3 to 20 [for example, trade names: MA-50A, MA-80A, MA-100A, MA-150MF and the like manufactured by NIPPON NYUKAZAI CO., LTD.], and the present invention is not limited only to those exemplified ones. These functional group-containing monomers can be used singly or two or more kinds thereof can be used in combination.

Incidentally, in the present invention, the term "(meth)acrylic acid" means acrylic acid or methacrylic acid, and acrylic acid and methacrylic acid can be used singly or in combination.

Among the functional group-containing monomers represented by the formula (I), hydroxyethyl (meth)acrylate, hydroxybutyl (meth)acrylate, (meth)acrylic acid and glycidyl (meth)acrylate are preferable from the viewpoint of obtaining a clear coating composition which exhibits low colorability, has a high refractive index without use of a filler, exhibits excellent glossy feel even in the case of using a filler, and can be coated into a thick film. These functional group-containing monomers can be used singly or two or more kinds thereof can be used in combination.

The content of the aromatic ring-containing (meth)acrylate and the content of the functional group-containing monomer in the monomer component cannot be absolutely determined since the content varies depending on the functional group of the crosslinking agent described later and the amount of the crosslinking agent used. The content of the aromatic ring-containing (meth)acrylate in the monomer component is usually preferably 5 to 90% by mass, more preferably 10 to 85% by mass, and further preferably 15 to 80% by mass, and the content of the functional group-containing monomer in the monomer component is preferably 10 to 95% by mass, more preferably 15 to 90% by mass, and further preferably 20 to 85% by mass, from the viewpoint of obtaining a clear coating composition which exhibits low colorability, has a high refractive index without use of a filler, exhibits excellent glossy feel even in the case of using a filler, and can be coated into a thick film by sufficiently reacting the functional group-containing (meth) acrylate-based polymer to be obtained with the crosslinking agent.

Incidentally, in the present invention, the monomer component may contain another monomer (hereinafter, simply referred to as "another monomer") other than the aromatic ring-containing (meth)acrylate and the functional group-containing monomer in an appropriate amount within a scope which would not impair an object of the present invention.

Examples of another monomer include, for example, alkyl (meth)acrylates such as methyl (meth)acrylate, ethyl (meth)acrylate, isopropyl (meth)acrylate, n-butyl (meth)acrylate, isobutyl (meth)acrylate, tert-butyl (meth)acrylate, n-amyl (meth)acrylate, isoamyl (meth)acrylate, n-hexyl (meth)acrylate, cyclohexyl (meth)acrylate, 2-ethylhexyl (meth)acrylate, n-octyl (meth)acrylate, decyl (meth)acrylate and dodecyl (meth)acrylate; N-substituted (meth)acrylamides such as N-methylol (meth)acrylamide and N-butoxymethyl (meth)acrylamide; aliphatic (meth)acrylic monomers having a carbon-carbon unsaturated double bond, such as (meth)acrylonitrile; aromatic monomers such as styrene, α-methylstyrene, tert-butylstyrene, chlorostyrene and vinyltoluene other than the aromatic ring-containing (meth)acrylate, and the like, and the present invention is not limited only to those exemplified ones. These monomers can be used singly or two or more kinds thereof can be used in combination.

The content of another monomer in the monomer component is preferably 85% by mass or less, more preferably 75% by mass or less, and further preferably 65% by mass or less, from the viewpoint of obtaining a clear coating composition which exhibits low colorability, has a high refractive index without use of a filler, exhibits excellent glossy feel even in the case of using a filler, and can be coated into a thick film.

Examples of a method for polymerizing the monomer component include, for example, a bulk polymerization method, a solution polymerization method, an emulsion polymerization method, a suspension polymerization method and the like, and the present invention is not limited only to those exemplified ones. Among these polymerization methods, a solution polymerization method is preferred.

In the case of polymerizing the monomer component by a solution polymerization method, for example, the monomer component can be polymerized by dissolving a polymerization initiator in an organic solvent, and adding the monomer component to the solution while stirring the solution thus obtained, or the monomer component can be polymerized by dissolving the monomer component in an organic solvent, and adding a polymerization initiator to the solution while stirring the solution thus obtained.

Examples of the organic solvent include, for example, ketone compounds such as acetylacetone, methyl ethyl ketone, methyl isobutyl ketone, cyclopentanone, cyclohexanone and isophorone, ether compounds such as ethylene glycol dimethyl ether, diethylene glycol dimethyl ether and dioxane, esters of acetic acid, such as butyl acetate, ethylene glycol monomethyl ether acetate, ethylene glycol monoethyl ether acetate, propylene glycol monomethyl ether acetate and propylene glycol monoethyl ether acetate, hydrocarbon compounds such as toluene and xylene, and the like, and the present invention is not limited only to those exemplified ones. These solvents can be used singly or two or more kinds thereof can be used in combination. It is preferred to usually control the amount of the organic solvent so that the concentration of the monomer component is 15 to 80% by mass.

It is preferred to use a polymerization initiator when polymerizing the monomer component. Examples of the polymerization initiator include, for example, azobisisobutyronitrile, azoisobutyronitrile, methyl azoisobutyrate, azobisdimethylvaleronitrile, benzoyl peroxide, potassium persulfate, ammonium persulfate, a benzophenone derivative, a phosphine oxide derivative, a benzoketon derivative, a phenyl thio ether derivative, an azide derivative, a diazo derivative, a disulfide derivative and the like, and the present invention is not limited only to those exemplified ones. These polymerization initiators can be used singly or two or more kinds thereof can be used in combination. The amount of the polymerization initiator is not particularly limited, and the amount is usually preferably about 0.05 to about 20 parts by mass per 100 parts by mass of the monomer component.

In addition, a chain transfer agent can be used when polymerizing the monomer component. The chain transfer agent can be usually used by mixing the chain transfer agent with the monomer component. Examples of the chain transfer agent include, for example, mercaptan group-containing compounds such as lauryl mercaptan, dodecyl mercaptan and thioglycerol, inorganic salts such as sodium hypophosphite and sodium hydrogen sulfite, and the like, and the present invention is not limited only to those exemplified ones. These chain transfer agents can be used singly or two or more kinds thereof can be used in combination. The amount of the chain transfer agent is not particularly limited, and the amount is usually preferably about 0.01 to about 10 parts by mass per 100 parts by mass of the monomer component.

When polymerizing the monomer component, the temperature of polymerization reaction and the atmosphere are not particularly limited. The temperature of the polymerization reaction is usually about 60 to about 200° C. The atmosphere where the polymerization reaction is carried out is, for example, preferably an inert gas atmosphere such as a nitrogen gas. In addition, the time period for carrying out the polymerization reaction of the monomer component cannot be absolutely determined since the time period varies depending on the temperature of the polymerization reaction, and the time period is usually about 3 to about 20 hours.

The functional group-containing (meth)acrylate-based polymer is obtained by polymerizing the monomer component as mentioned above.

The weight average molecular weight of the functional group-containing (meth)acrylate-based polymer is preferably 1000 to 500,000, and more preferably 4500 to 100,000 in consideration of the film-forming property of the clear coating composition and workability when coating the clear coating composition. Incidentally, the weight average molecular weight of the functional group-containing (meth)

acrylate-based polymer is a value as determined by a method used in the working examples described later.

Next, the clear coating composition is obtained by mixing the functional group-containing (meth)acrylate-based polymer thus obtained with a crosslinking agent. Incidentally, in the case of preparing the functional group-containing (meth) acrylate-based polymer by a solution polymerization method, it is possible to mix the reaction mixture containing the functional group-containing (meth)acrylate-based polymer obtained by the solution polymerization method with a crosslinking agent.

Representative examples of the crosslinking agent include, for example, a thermosetting crosslinking agent. Examples of the thermosetting crosslinking agent include, for example, a melamine resin, a polyisocyanate, an epoxy resin, a polycarboxylic acid and the like, and the present invention is not limited only to those exemplified ones. These crosslinking agents can be used singly or two or more kinds thereof can be used in combination. Among these crosslinking agents, the melamine resin, the polyisocyanate and the epoxy resin are preferred, and the polyisocyanate is more preferred.

Examples of the melamine resin include, for example, a methylated melamine resin, a butylated melamine resin and the like, and the present invention is not limited only to those exemplified ones. These melamine resins can be used singly or two or more kinds thereof can be used in combination.

Examples of the polyisocyanate include, for example, bifunctional isocyanates such as hexamethylene diisocyanate, N,N',N"-tri(6-isocyanatohexyl) isocyanurate, toluene diisocyanate and methylene bisphenyl diisocyanate, trifunctional isocyanates such as triphenylmethane triisocyanate, bicycloheptane triisocyanate and dibenzylbenzene triisocyanate, and the like, and the present invention is not limited only to those exemplified ones. These polyisocyanates can be used singly or two or more kinds thereof can be used in combination.

Examples of the epoxy resin include, for example, bisphenol diglycidyl ether, a bifunctional reactive epoxy resin [for example, trade name: ADEKA GLYCIROL ED-503 and the like manufactured by ADEKA CORPORATION], phthalic acid diglycidyl ester, triglycidyl isocyanurate, a phenol novolac epoxy resin, a cresol novolac epoxy resin and the like, and the present invention is not limited only to those exemplified ones. These epoxy resins can be used singly or two or more kinds thereof can be used in combination.

Examples of the polycarboxylic acid include, for example, dicarboxylic acids and their anhydrides, such as phthalic acid, adipic acid and tetra hydrophthalic anhydride, trimellitic acid and its anhydride, pyromellitic acid and its anhydride, and the like, and the present invention is not limited only to those exemplified ones. These polycarboxylic acids can be used singly or two or more kinds thereof can be used in combination.

With regard to the proportion of the crosslinking agent to the functional group-containing (meth)acrylate-based polymer, the molar ratio [total amount (moles) of functional group of functional group-containing (meth)acrylate-based polymer/total amount (moles) of functional group of the crosslinking agent] of the total amount (moles) of the functional group of the crosslinking agent which reacts with the functional group of the functional group-containing (meth)acrylate-based polymer to the total amount (moles) of the functional group of the functional group-containing (meth)acrylate-based polymer is stoichiometrically 1/1, and is preferably 1/3 to 3/1, more preferably 1/2 to 2/1, from the viewpoint of decrease in residual amount of the functional group-containing (meth)acrylate-based polymer or the crosslinking agent.

In addition, it is preferred that the amount of the crosslinking agent per 100 parts by mass of the functional group-containing (meth)acrylate-based polymer (solid) is appropriately controlled in accordance with the kind and number of the functional group of the functional group-containing (meth)acrylate-based polymer contained in the clear coating composition. The content of the crosslinking agent in 100 parts by mass of the clear coating composition is preferably 1 to 60 parts by mass, more preferably 2 to 40 parts by mass, and further preferably 3 to 30 parts by mass, from the viewpoint of obtaining a clear coating composition which exhibits low colorability, has a high refractive index without use of a filler, exhibits excellent glossy feel even in the case of using a filler, and can be coated into a thick film.

A filler can be contained in the clear coating composition within a scope which would not impair an object of the present invention. When the filler is contained in the clear coating composition, the refractive index of the clear coating composition can be increased.

Examples of the filler include, for example, a metal filler made of a metal such as silver, gold, platinum, palladium, a silver-platinum alloy or a palladium-platinum alloy, a metal oxide filler such as silica, alumina, zirconia or titania, and the like, and the present invention is not limited only to those exemplified ones. These fillers can be used singly or two or more kinds thereof can be used in combination.

The average particle diameter of the filler is preferably 3 nm or more, and more preferably 5 nm or more, from the viewpoint of suppression of secondary aggregation of the particles, and the average particle diameter is preferably 30 nm or less, more preferably 25 nm or less, and further preferably 20 nm or less from the viewpoint of improvement in uniformity of the coating film to be formed. Incidentally, the average particle diameter of the filler is a value as determined by using a dynamic light scattering type particle diameter distribution analyzer [trade name: Nanotrac Wave-EX150 manufactured by NIKKISO CO., LTD.].

The amount of the filler (solid) per 100 parts by mass of the functional group-containing (meth)acrylate-based polymer (solid) is 0 part by mass or more. The amount is preferably 1 part by mass or more, more preferably 3 parts by mass or more, and further preferably 5 parts by mass or more, from the viewpoint of increase in refractive index of the clear coating composition, and the amount is preferably 25 parts by mass or less, more preferably 20 parts by mass or less, further preferably 15 parts by mass or less, and furthermore preferably 10 parts by mass or less, from the viewpoint of enhancement in transparency of the coating film to be formed and thickening a coating film.

Incidentally, the clear coating composition may contain a curing catalyst in an appropriate amount from the viewpoint of improvement in curability of the clear coating composition.

Examples of the curing catalyst include, for example, tin-based curing catalysts such as monomethyl stannate, monobutyltin oxide, monobutyltin hydroxychloride, monobutyltin trioctoate, monobutyl stannate, monobutyltin tris(2-ethylhexoate), butyltin trichloride, butyltin trimethylate, monophenyltin tribromide, dimethyltin oxide, dibutyltin oxide, dibutyltin dibromide, dibutyltin dichloride, diphenyltin dichloride, dibutyltin diacetate, dioctyltin diacetate, dibutyltin maleate, dibutyltin dithiol, dibutyltin bis(2-ethylhexoate), dibutyltin sulfide, diphenyltin sulfide, dibutyltin dilaurate, dioctyltin oxide, dioctyltin dilaurate, dioctyltin dimethoxide, dioctyltin dibutoxide, triphenyltin acetate, diphenyltin dichloride, tributyltin chloride, tetra-n-butyl-1,3-diacetoxydistanoxane, tetra-n-butyl-1,3-dioctyloxydistanoxane and tetra-n-butyl-1,3-dilauryloxydistanoxane, amine-based curing catalysts such as salts of a quaternary ammonium such as dimethylbenzylamine, ethanolamine, N-methylethanolamine, triethanolamine, N,N-dimethylethanolamine, n-butylamine, diethylamine, triethylamine, 1,4-diazabicyclo[2.2.2]octane, tetramethylenediamine, cyclohexylamine, imidazole, 1-methylimidazole, 2,4-dimethylimidazole, 1,4-diethylimidazole, tetramethylammonium, tetrabutylammonium, trimethyl(2-hydroxypropyl)ammonium, cyclohexyltrimethylammonium, tetrakis(hydroxymethyl)ammonium, dilauryldimethylammonium, trioctylmethylammonium and o-trifluoromethylphenyltrimethylammonium, quaternary ammonium salts having a chloride, a bromide, a carbonate or a hydroxide as a counter anion, and the like, and the present invention is not limited only to those exemplified ones. These curing catalysts can be used singly or two or more kinds thereof can be used in combination. Among these curing catalysts, triethylenediamine, 1,4-diazabicyclo[2.2.2]octane and triethylamine are preferred, and triethylamine is more preferred.

The amount of the curing catalyst is not particularly limited, and the amount is preferably 0.01 part by mass or more, more preferably 0.1 part by mass or more, and further preferably 0.3 part by mass or more per 100 parts by mass of the functional group-containing (meth)acrylate-based polymer, and the amount is preferably 10 parts by mass or less, more preferably 5 parts by mass or less, and further preferably 3 parts by mass or less, since a higher effect cannot be expected even when the curing catalyst is used in an excessive amount.

In addition, in the present invention, for example, the clear coating composition may contain a silane coupling agent such as methyltrimethoxysilane, vinyltrimethoxysilane, γ-(meth)acryloyloxypropyltrimethoxysilane, γ-glycidoxypropyltrimethoxysilane, β-(3,4-epoxycyclohexyl)ethyltrimethoxysilane or γ-glycidoxypropylmethyldiethoxysilane in an appropriate amount if necessary in order to improve adhesive property of the clear coating composition.

The clear coating composition of the present invention can be easily prepared by mixing the respective components described above. The clear coating composition can be prepared, for example, by dissolving these components in an appropriate solvent in an appropriate amount so as to have a uniform composition. Incidentally, in this case, it is preferred to adjust the amount of solvent so that the solid concentration of the clear coat resin composition in a solution of the clear coating composition is about 15 to about 80% by mass.

Examples of the solvent include, for example, ketone compounds such as acetylacetone, methyl ethyl ketone, methyl isobutyl ketone, cyclopentanone, cyclohexanone and isophorone, ether compounds such as ethylene glycol dimethyl ether, diethylene glycol dimethyl ether and dioxane, esters of acetic acid, such as butyl acetate, ethylene glycol monomethyl ether acetate, ethylene glycol monoethyl ether acetate, propylene glycol monomethyl ether acetate and propylene glycol monoethyl ether acetate, and the like, and the present invention is not limited only to those exemplified ones. These solvents can be used singly or two or more kinds thereof can be used in combination. Incidentally, among these solvents, butyl acetate, ethylene glycol monomethyl ether acetate, diethylene glycol dimethyl ether acetate and cyclopentanone are preferred, since solubility of the clear coating composition of the present invention improves, and cyclopentanone is more preferable from the viewpoint of improvement in dispersibility of an inorganic filler.

The order to mix the respective components and the concentration of the clear coating composition in a solution of the clear coating composition are not particularly limited, and it is preferred to appropriately select the order and the concentration in accordance with uses, a coating method and the like of the clear coating composition of the present invention.

The concentration of the clear coating composition in a solution of the clear coating composition is usually preferably about 15 to about 80% by mass from the viewpoint of enhancement in coatability and controlling the coating film so as not to be too thick.

In addition, the clear coating composition of the present invention may contain, for example, a coloring agent such as a pigment or a dye, an aqueous resin, a rheology controlling agent, a dispersing agent, a defoaming agent, an antioxidant, or an ultraviolet absorber within a scope which would not impair an object of the present invention.

Examples of the method for coating the clear coating composition of the present invention include, for example, a spraying method, a spin coating method, a roll coater method and the like, and the present invention is not limited only to those exemplified ones.

Examples of the material used in the article to be coated which can be coated with the clear coating composition of the present invention include, for example, a metal such as iron, aluminum, brass, copper, tin plate, stainless steel, galvanized steel or a zinc-based alloy such as zinc-aluminum alloy, a zinc-nickel alloy or a zinc-iron alloy; a resin such as polyethylene, polypropylene, acrylonitrile-butadiene-styrene (ABS) resin, polyamide, acrylic resin, vinylidene chloride resin, polycarbonate, polyurethane or epoxy resin; an inorganic material such as glass, mortar, cement or concrete; wood; a fiber such as paper, woven fabric or non-woven fabric, and the like, and the present invention is not limited only to those exemplified ones. Among these materials, the metal and the resin are preferred in the present invention.

It is possible to coat the clear coating composition of the present invention on an article to be coated and to dry the formed coating film by heating. The formed coating film can be dried, for example, by heating the coating film at a temperature of 60 to 170° C. for 10 to 40 minutes.

In addition, it is preferred to adjust the thickness of the formed coating film after dried to about 15 to about 60 μm. When the clear coating composition of the present invention is used, there is an advantage such that a coating film having such a thickness can be formed.

As described above, the clear coating composition of the first aspect of the present invention exhibits low colorability, has a high refractive index without use of a filler, exhibits excellent glossy feel even in the case of using a filler, and can be coated into a thick film. Therefore, the clear coating composition can be suitably used, for example, for an article to be coated, such as an outer plate of the body of a motor vehicle such as a passenger car, a truck, a motorcycle or a bus, a part of a motor vehicle, an electronic device, a mobile phone, and an outer plate of a household electric appliance such as an audio device, and among them, an article to be coated such as an outer plate of a body of a motor vehicle and a part of a motor vehicle.

Second Aspect of the Present Invention

As described above, the clear coating composition of the second aspect of the present invention is a clear coating composition used for a top coat, and contains (A) a functional group-containing (meth)acrylate-based polymer made by the polymerization of a monomer component containing a functional group-containing monomer represented by the formula (I):

[Chem. 11]

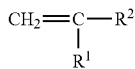
(I)

wherein $R^1$ represents hydrogen atom or methyl group, and $R^2$ represents hydroxyl group, an alkyl group of 1 to 4 carbon atoms having hydroxyl group, carboxyl group, an alkyl group of 1 to 4 carbon atoms having carboxyl group, epoxy group, an alkyl group of 1 to 4 carbon atoms having epoxy group, a hydroxyalkyloxycarbonyl group having a hydroxyalkyl group of 1 to 4 carbon atoms, or a group represented by the formula:

[Chem. 12]

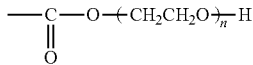

wherein, n represents an integer of 3 to 20, and a fluorine atom-containing monomer represented by the formula (II):

[Chem. 13]

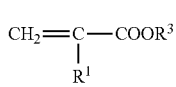
(II)

wherein $R^1$ is the same as mentioned above, and $R^2$ represents an alkyl group of 1 to 12 carbon atoms having 3 to 8 fluorine atoms, and (B) a crosslinking agent.

Incidentally, in the present invention, the term "(meth) acrylate" means an acrylate or a methacrylate, and the acrylate and the methacrylate can be used singly or in combination. In addition, the term "(meth)acrylic acid" means acrylic acid or methacrylic acid, and acrylic acid and methacrylic acid can be used singly or in combination.

The functional group-containing monomer represented by the formula (I) is used in order to introduce a functional group into a polymer to be obtained. Examples of the functional group of the functional group-containing monomer include hydroxyl group, carboxyl group and epoxy group. These functional groups can be used singly in one molecule, or a plurality of the same or different functional groups may be present in one molecule.

In the functional group-containing monomer represented by the formula (I), $R^1$ represents hydrogen atom or methyl group. In addition, $R^2$ represents hydroxyl group, an alkyl group of 1 to 4 carbon atoms having hydroxyl group, carboxyl group, an alkyl group of 1 to 4 carbon atoms having carboxyl group, epoxy group, an alkyl group of 1 to 4 carbon atoms having epoxy group, a hydroxyalkyloxycarbonyl group having a hydroxyalkyl group of 1 to 4 carbon atoms, or a group represented by the formula:

[Chem. 14]

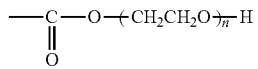

wherein n represents an integer of 3 to 20. Examples of the alkyl group having 1 to 4 carbon atoms include, for example, methyl group, ethyl group, n-propyl group, isopropyl group, n-butyl group, isobutyl group, tert-butyl group and the like.

Examples of the functional group-containing monomer represented by the formula (I) include, for example, vinyl alcohol, (meth)allyl alcohol, hydroxymethyl (meth)acrylate, hydroxyethyl (meth)acrylate, hydroxypropyl (meth)acrylate, hydroxybutyl (meth)acrylate, (meth)acrylic acid, allyl carboxylate, glycidyl (meth)acrylate, polyethylene glycol mono(meth)acrylate in which the number of moles of ethylene oxide group added is 3 to 20 [for example, trade names: MA-50A, MA-80A, MA-100A, MA-150MF and the like manufactured by NIPPON NYUKAZAI CO., LTD.] and the like, and the present invention is not limited only to those exemplified ones. These functional group-containing monomers can be used singly or two or more kinds thereof can be used in combination.

Among the functional group-containing monomers represented by the formula (I), hydroxyethyl (meth)acrylate, hydroxybutyl (meth)acrylate, (meth)acrylic acid, glycidyl (meth)acrylate, and polyethylene glycol mono(meth)acrylate in which the number of moles of ethylene oxide group added is 3 to 20 are preferred from the viewpoint of forming a coating film which exhibits excellent transparency and deep feel, is hard, and exhibits durability. These functional group-containing monomers can be used singly or two or more kinds thereof can be used in combination.

In the present invention, since a fluorine atom-containing monomer represented by the formula (II) is used, it is possible to form a coating film which exhibits excellent transparency and deep feel, which is hard, and which exhibits durability.

In the fluorine atom-containing monomer represented by the formula (II), $R^1$ represents hydrogen atom or methyl group. In addition, $R^3$ represents an alkyl group of 1 to 12 carbon atoms having 3 to 8 fluorine atoms. Among $R^3$, an alkyl group of 2 to 10 carbon atoms having 3 to 8 fluorine atoms is preferred, an alkyl group of 2 to 10 carbon atoms having 3 to 8 fluorine atoms is more preferable, an alkyl group of 2 to 8 carbon atoms having 3 to 8 fluorine atoms is further preferable, an alkyl group of 2 to 6 carbon atoms having 3 to 8 fluorine atoms is furthermore preferable, and an alkyl group of 2 to 4 carbon atoms having 3 fluorine atoms is still further preferable, from the viewpoint of forming a coating film which exhibits excellent transparency and deep feel, is hard, and exhibits durability.

The fluorine atom-containing monomer represented by the formula (II) can be easily commercially available. Examples of the commercially available fluorine atom-containing monomer represented by the formula (II) include, for example, trade name: Viscoat 3F [in the formula (II), $R^1$ represents hydrogen atom and $R^3$ represents an alkyl group of 2 carbon atoms having 3 fluorine atoms, refractive index: 1.361], trade name: Viscoat 3FM [in the formula (II), $R^1$ represents a methyl group and $R^3$ represents an alkyl group of 2 carbon atoms having 3 fluorine atoms, refractive index: 1.348], trade Name: Viscoat 4F [in the formula (II), $R^1$ represents hydrogen atom and $R^3$ represents an alkyl group of 3 carbon atoms having 4 fluorine atoms, refractive index: 1.363], trade name: Viscoat 8F [in the formula (II), $R^1$ represents hydrogen atom and $R^3$ represents an alkyl group of 5 carbon atoms having 8 fluorine atoms, refractive index: 1.333], and trade name: Viscoat 8FM [in the formula (II), $R^1$ represents a methyl group and $R^3$ represents an alkyl group of 5 carbon atoms having 8 fluorine atoms, refractive index: 1.357] manufactured by Osaka Organic Chemical Industry Ltd., and the present invention is not limited only to those exemplified ones.

The fluorine atom-containing monomer is preferably a fluorine atom-containing monomer having a refractive index of 1.33 or more, and more preferably a fluorine atom-containing monomer having a refractive index of 1.34 or more, from the viewpoint of forming a coating film which exhibits excellent transparency and deep feel, is hard, and exhibits durability.

The contents of the functional group-containing monomer and the fluorine atom-containing monomer in the monomer component cannot be absolutely determined, since the content varies depending on the functional group of the crosslinking agent described later and the amount of the crosslinking agent used. The content of the functional group-containing monomer is usually preferably 5 to 40% by mass, more preferably 5 to 30% by mass, and further preferably 5 to 20% by mass, and the content of the fluorine atom-containing monomer is usually preferably 60 to 95% by mass, more preferably 70 to 95% by mass, and further preferably 80 to 95% by mass, from the viewpoint of forming a coating film which exhibits excellent transparency and deep feel, is hard, and exhibits durability by sufficiently reacting the functional group-containing (meth)acrylate-based polymer with the crosslinking agent.

Incidentally, in the present invention, the monomer component may contain another monomer (hereinafter, simply referred to as "another monomer") other than the functional group-containing monomer and the fluorine atom-containing monomer in an appropriate amount within a scope which would not impair an object of the present invention.

Examples of another monomer include, for example, alkyl (meth)acrylates such as methyl (meth)acrylate, ethyl (meth) acrylate, isopropyl (meth)acrylate, n-butyl (meth)acrylate, isobutyl (meth)acrylate, tert-butyl (meth)acrylate, n-amyl (meth)acrylate, isoamyl (meth)acrylate, n-hexyl (meth)acrylate, cyclohexyl (meth)acrylate, 2-ethylhexyl (meth)acrylate, n-octyl (meth)acrylate, decyl (meth)acrylate and dodecyl (meth)acrylate; N-substituted (meth)acrylamides such as N-methylol (meth)acrylamide and N-butoxymethyl (meth) acrylamide, aliphatic (meth)acrylic monomers having a carbon-carbon unsaturated double bond such as (meth)acrylonitrile, aromatic monomers such as styrene, α-methylstyrene, tert-butylstyrene, chlorostyrene and vinyltoluene other than the aromatic ring-containing (meth)acrylate, and the like, and the present invention is not limited only to those exemplified ones. These monomers can be used singly or two or more kinds thereof can be used in combination.

The content of another monomer in the monomer component is preferably 50% by mass or less, more preferably 40% by mass or less, and further preferably 30% by mass or less, from the viewpoint of forming a coating film which exhibits excellent transparency and deep feel, is hard, and exhibits durability.

Examples of a method for polymerizing the monomer component include, for example, a bulk polymerization method, a solution polymerization method, an emulsion polymerization method, a suspension polymerization method and the like, and the present invention is not limited only to those exemplified ones. Among these polymerization methods, a solution polymerization method is preferred.

When the monomer component is polymerized by a solution polymerization method, for example, the monomer component can be polymerized by dissolving a polymerization initiator in an organic solvent, and adding the monomer component to the solution while stirring the solution thus obtained, or the monomer component can be polymerized by dissolving the monomer component in an organic solvent, and adding a polymerization initiator to the solution while stirring the solution thus obtained.

Examples of the organic solvent include, for example, esters of acetic acid, such as butyl acetate, cyclohexanone, cyclopentanone and propylene glycol monomethyl ether acetate, hydrocarbon compounds such as toluene and xylene, ketone compounds such as methyl ethyl ketone and methyl isobutyl ketone, and the like, and the present invention is not limited only to those exemplified ones. It is preferred to adjust the amount of the organic solvent so that the concentration of the monomer component is usually 15 to 80% by mass.

It is preferred to use a polymerization initiator when polymerizing the monomer component. Examples of the polymerization initiator include, for example, azobisisobutyronitrile, azoisobutyronitrile, methyl azoisobutyrate, azobisdimethylvaleronitrile, benzoyl peroxide, potassium persulfate, ammonium persulfate, a benzophenone derivative, a phosphine oxide derivative, a benzoketon derivative, a phenyl thio ether derivative, an azide derivative, a diazo derivative, a disulfide derivative and the like, and the present invention is not limited only to those exemplified ones. These polymerization initiators can be used singly or two or more kinds thereof can be used in combination. The amount of the polymerization initiator is not particularly limited, and the amount is usually preferably about 0.05 to about 20 parts by mass per 100 parts by mass of the monomer component.

In addition, in the present invention, a chain transfer agent can be used when the monomer component is polymerized. The chain transfer agent can be usually used by mixing with the monomer component. Examples of the chain transfer agent include, for example, mercaptan group-containing compounds such as lauryl mercaptan, dodecyl mercaptan and thioglycerol, inorganic salts such as sodium hypophosphite and sodium hydrogen sulfite, and the like, and the present invention is not limited only to those exemplified ones. These chain transfer agents can be used singly or two or more kinds thereof can be used in combination. The amount of the chain transfer agent is not particularly limited, and the amount is usually preferably about 0.01 to about 10 parts by mass per 100 parts by mass of the monomer component.

The temperature of the polymerization reaction and the atmosphere when polymerizing the monomer component are not particularly limited. The temperature of the polymerization reaction is usually about 60 to about 200° C. The atmosphere where the polymerization reaction is carried out is, for example, preferably an inert gas atmosphere such as a nitrogen gas. In addition, the time period for the polymerization reaction of the monomer component cannot be absolutely determined, since the time period varies depending on the temperature of the polymerization reaction, and the time period is usually about 3 to about 20 hours.

The functional group-containing (meth)acrylate-based polymer is obtained by polymerizing the monomer component as mentioned above.

The weight average molecular weight of the functional group-containing (meth)acrylate-based polymer is preferably 1000 to 500,000, and more preferably 4500 to 100,000 in consideration of film-forming property of the clear coating composition and workability when the clear coating composition is coated. Incidentally, the weight average molecular weight of the functional group-containing (meth)acrylate-based polymer is a value as determined by a method described in the working examples described later.

Next, the clear coating composition is obtained by mixing the functional group-containing (meth)acrylate-based polymer thus obtained and a crosslinking agent. Incidentally, in the case of preparing the functional group-containing (meth)acrylate-based polymer by a solution polymerization method, it is possible to mix the reaction mixture containing the functional group-containing (meth)acrylate-based polymer obtained by the solution polymerization method with a crosslinking agent.

Representative examples of the crosslinking agent include, for example, a thermosetting crosslinking agent. Examples of the thermosetting crosslinking agent include, for example, a melamine resin, a polyisocyanate, epoxy group-containing compound, a polycarboxylic acid and the like, and the present invention is not limited only to those exemplified ones. These crosslinking agents can be used singly or two or more kinds thereof may be used by mixing. Among them, the melamine resin, the polyisocyanate and the epoxy group-containing compound are preferred, and the polyisocyanate is more preferred.

Examples of the melamine resin include, for example, a methylated melamine resin, a butylated melamine resin and the like, and the present invention is not limited only to those exemplified ones. These melamine resins can be used singly or two or more kinds thereof may be used by mixing.

Examples of the polyisocyanate include, for example, bifunctional isocyanates such as hexamethylene diisocyanate, toluene diisocyanate and methylene bisphenyl diisocyanate, trifunctional isocyanates such as triphenylmethane triisocyanate, 2,4,6-trioxohexahydro-2,3,5-triazine-1,3,5-triyltris(6,1-hexanediyl)tris isocyanate and a polyol-modified polyisocyanate, and the like, and the present invention is not limited only to those exemplified ones. These polyisocyanates can be used singly or two or more kinds thereof may be used by mixing.

Examples of the epoxy group-containing compound include, for example, 1,6-hexanediol diglycidyl ether, bisphenol diglycidyl ether, a bifunctional reactive epoxy resin [for example, trade name: ADEKA GLYCIROL ED-503 and the like manufactured by ADEKA CORPORATION], phthalic acid diglycidyl ester, triglycidyl isocyanurate, a phenol novolac epoxy resin, a cresol novolac epoxy resin and the like, and the present invention is not limited only to those exemplified ones. These epoxy group-containing compounds can be used singly or two or more kinds thereof may be used by mixing.

Examples of the polycarboxylic acid include, for example, dicarboxylic acids and their anhydrides, such as adipic acid, hexane-1,6-dicarboxylic acid, phthalic acid, adipic acid, tetra hydrophthalic anhydride, trimellitic acid and its anhydride, pyromellitic acid and its anhydride, and the like, and the present invention is not limited only to those exemplified ones. These polycarboxylic acids can be used singly or two or more kinds thereof may be used by mixing.

With regard to the proportion of the crosslinking agent to the functional group-containing (meth)acrylate-based polymer, the molar ratio of the total amount (moles) of the functional group of the crosslinking agent which reacts with the functional group of the functional group-containing (meth)acrylate-based polymer to the total amount (moles) of the functional group of the functional group-containing (meth)acrylate-based polymer [total amount (moles) of functional group of functional group-containing (meth)acrylate-based polymer/total amount (moles) of functional group of crosslinking agent] is stoichiometrically 1/1, and the molar ratio is preferably 1/3 to 3/1, and more preferably 1/2 to 2/1, from the viewpoint of decrease in residual amount of the functional group-containing (meth)acrylate-based polymer or the crosslinking agent.

In addition, it is preferred that the amount of the crosslinking agent per 100 parts by mass of the functional group-containing (meth)acrylate-based polymer (solid) is appropriately controlled in accordance with the kind and number of the functional group of the functional group-containing (meth)acrylate-based polymer contained in the clear coating composition. The amount of the crosslinking agent per 100 parts by mass of the functional group-containing (meth)acrylate-based polymer (solid) is preferably 1 to 60 parts by mass, more preferably 2 to 40 parts by mass, and further preferably 3 to 30 parts by mass, from the viewpoint of forming a coating film which exhibits excellent transparency and deep feel, is hard, and exhibits durability.

Incidentally, the clear coating composition may contain a curing catalyst in an appropriate amount from the viewpoint of improvement in curability of the clear coating composition.

Examples of the curing catalyst include, for example, tin-based curing catalysts such as monomethyl stannate, monobutyltin oxide, monobutyltin hydroxychloride, monobutyltin trioctoate, monobutyl stannate, monobutyltin tris(2-ethylhexoate), butyltin trichloride, butyltin trimethylate, monophenyltin tribromide, dimethyltin oxide, dibutyltin oxide, dibutyltin dibromide, dibutyltin dichloride, diphenyltin dichloride, dibutyltin diacetate, dioctyltin diacetate, dibutyltin maleate, dibutyltin dithiol, dibutyltin bis(2-ethylhexoate), dibutyltin sulfide, diphenyltin sulfide, dibutyltin dilaurate, dioctyltin oxide, dioctyltin dilaurate, dioctyltin dimethoxide, dioctyltin dibutoxide, triphenyltin acetate, diphenyltin dichloride, tributyltin chloride, tetra-n-butyl-1,3-diacetoxydistanoxane, tetra-n-butyl-1,3-dioctyloxydistanoxane and tetra-n-butyl-1,3-dilauryloxydistanoxane, amine-based curing catalysts such as salts of a quaternary ammonium such as dimethylbenzylamine, ethanolamine, N-methylethanolamine, triethanolamine, N,N-dimethylethanolamine, n-butylamine, diethylamine, triethylamine, 1,4-diazabicyclo[2.2.2]octane, tetramethylenediamine, cyclohexylamine, imidazole, 1-methylimidazole, 2,4-dimethylimidazole, 1,4-diethylimidazole, tetramethylammonium, tetrabutylammonium, trimethyl(2-hydroxypropyl)ammonium, cyclohexyltrimethylammoniunm, tetrakis(hydroxymethyl)ammonium, dilauryldimethylammonium, trioctylmethylammonium and o-trifluoromethylphenyltrimethylammonium, quaternary ammonium salts having a chloride, a bromide, a carbonate or a hydroxide as a counter anion, and the like, and the present invention is not limited only to those exemplified ones. These curing catalysts can be used singly or two or more kinds thereof can be used in combination. Among these curing catalysts, triethylenediamine, 1,4-diazabicyclo [2.2.2]octane and triethylamine are preferable, and triethylamine is more preferable.

The amount of the curing catalyst is not particularly limited, and the amount is preferably 0.01 part by mass or more, more preferably 0.1 part by mass or more, and further preferably 0.3 part by mass or more per 100 parts by mass of the functional group-containing (meth)acrylate-based polymer, from the viewpoint of improvement in curability of the clear coating composition, and the amount is preferably 10 parts by mass or less, more preferably 5 parts by mass or less, and further preferably 3 parts by mass or less, since a higher effect cannot be expected even when the curing catalyst is used in an excessive amount.

In addition, in the present invention, the clear coating composition may contain, for example, a silane coupling agents such as methyltrimethoxysilane, vinyltrimethoxysilane, γ-(meth)acryloyloxypropyltrimethoxysilane, γ-glycidoxypropyltrimethoxysilane, β-(3,4-epoxycyclohexyl)ethyltrimethoxysilane or γ-glycidoxypropylmethyldiethoxysilane in an appropriate amount if necessary, in order to improve adhesive property of the clear coating composition.

The clear coating composition of the present invention can be easily prepared by mixing the respective components described above. The clear coating composition can be prepared, for example, by dissolving these components in an appropriate solvent in an appropriate amount so as to have a uniform composition. Incidentally, in this case, it is preferred to adjust the amount of solvent so that the solid concentration of the clear coat resin composition is about 15 to about 80% by mass.

Examples of the solvent include, for example, ketones such as methyl isobutyl ketone, cyclohexanone and isophorone, ethers such as ethylene glycol dimethyl ether, diethylene glycol dimethyl ether and dioxane, esters of acetic acid, such as butyl acetate, ethylene glycol monomethyl ether acetate, ethylene glycol monoethyl ether acetate, propylene glycol monomethyl ether acetate and propylene glycol monoethyl ether acetate, and the like, and the present invention is not limited only to those exemplified ones. Incidentally, among these solvents, butyl acetate, ethylene glycol monomethyl ether acetate and diethylene glycol dimethyl ether acetate are preferable from the viewpoint of solubility of the clear coating composition of the present invention.

The order to mix the respective components and the concentration of the clear coating composition in a solution of the clear coating composition are not particularly limited, and it is preferred to appropriately select the order and the concentration in accordance with uses, a coating method of the clear coating composition according to the present invention, and the like. The concentration of the clear coating composition in a solution of the clear coating composition is usually preferably about 15 to about 80% by mass from the viewpoint of enhancement of coatability and controlling the coating film so as not to be too thick.

In addition, the clear coating composition of the present invention may contain, for example, a coloring agent such as a pigment or a dye, an aqueous resin, a rheology controlling agent, a dispersing agent, a defoaming agent, an antioxidant, an ultraviolet absorber and the like within a scope which would not impair an object of the present invention.

Examples of a method for coating the clear coating composition of the present invention include, for example, a spraying method, a spin coating method, a roll coater method and the like, and the present invention is not limited only to those exemplified ones.

Examples of a material used in an article to be coated, which can be coated with the clear coating composition of the present invention include, for example, a metal such as iron, aluminum, brass, copper, tin plate, stainless steel, galvanized steel or a zinc-based alloy such as zinc-aluminum alloy, a zinc-nickel alloy or a zinc-iron alloy; a resin such as polyethylene, polypropylene, acrylonitrile-butadiene-styrene (ABS) resin, polyamide, acrylic resin, vinylidene chloride resin, polycarbonate, polyurethane or epoxy resin; an inorganic material such as glass, mortar, cement or concrete; wood, and a fiber such as paper, woven fabric or non-woven fabric, and the like, and the present invention is not limited only to those exemplified ones. Among these materials, the metal and the resin are preferred in the present invention.

The clear coating composition of the present invention can be coated on an article to be coated, and the formed coating film can be dried by heating. The formed coating film can be dried by, for example, heating the coating film at a temperature of 60 to 170° C. for 10 to 40 minutes.

In addition, it is preferred to adjust the thickness of the formed coating film after drying to about 15 to about 60 μm. There is an advantage such that a coating film having such a thickness can be formed when the clear coating composition of the present invention is used.

As described above, the clear coating composition of the second aspect of the present invention can be coated into a thick film, and forms a coating film which is excellent in transparency and deep feel, which is hard, and which is excellent in durability. Therefore, the clear coating composition can be suitably used, for example, for an article to be coated such as an outer plate of the body of a motor vehicle such as a passenger car, a truck, a motorcycle or a bus, a part of a motor vehicle, an electronic device, a mobile phone, and an outer plate of a household electric appliance, such as an audio device, and among them, an article to be coated, such as an outer plate of a body of a motor vehicle or a part of a motor vehicle.

EXAMPLES

Examples of the First Aspect of the Present Invention

Next, the first aspect of the present invention will be described in more detail with reference to working examples, and the present invention is not limited only to the examples.

Preparation Example 1

A reaction vessel equipped with a stirrer, a condenser, a thermometer and a dropping funnel for continuous dropping was charged with 100 parts by mass of naphthol, 90 parts by mass of methyl ethyl ketone and 0.1 part by mass of dibutyltin dilaurate, and the temperature thereof was raised to 60° C. Thereafter, 105 parts by mass of 2-methacryloyloxyethyl isocyanate [trade name: Karenz MOI manufactured by Showa Denko K.K.] was added in the reaction vessel dropwise over 2 hours, and the mixture was aged for 3 hours.

Next, the reaction mixture thus obtained was added to 2,000 parts by mass of n-hexane, and the resulting precipitate was collected, and dried by an evaporator until no change in mass of the precipitate was observed, to give 2-(naphthoxycarbonylamino)ethyl methacrylate (hereinafter referred to as NFM).

Example I-1

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 45 parts by mass of benzyl methacrylate, 30 parts by mass of n-butyl methacrylate and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, and the weight average molecular weight thereof was 6000.

Incidentally, the hydroxyl value, acid value, weight per epoxy equivalent and weight average molecular weight of the functional group-containing (meth)acrylate-based polymer were determined by the following methods:

[Hydroxyl Value]

The hydroxyl value was determined in accordance with JIS-K 1557.

[Acid Value]

The acid value was determined in accordance with JIS-K 5601.

[Weight Per Epoxy Equivalent]

The weight per epoxy equivalent was measured in accordance with JIS-K 7147.

[Weight Average Molecular Weight]

The weight average molecular weight was determined by gel permeation chromatography [product number: HLC-8320GPC manufactured by Tosoh Corporation] using tetrahydrofuran as a developing solvent.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

As the physical properties of the clear coating composition thus obtained, refractive index, glossy feel and colorability were evaluated by the following methods. The results thereof are shown in Table 1.

[Method for Measuring Physical Properties of Clear Coating Composition]

(1) Refractive Index

The clear coating composition was coated on a polyester (polyethylene terephthalate) film so that the thickness thereof after drying was 30 μm, and the film having a coating film formed was dried by placing in a thermostatic chamber at 100° C. for 20 minutes, to give a test piece. The refractive index of the coating film of the test piece thus obtained was determined by means of a prism coupler (trade name: Model 2010 manufactured by METRICON CORPORATION).

(2) Glossy Feel and Colorability (Producing a Coated Product)

An intermediate paint [trade name: ORGA P-5U manufactured by Nippon Paint Co., Ltd.] was coated on a steel plate previously subjected to cationic electrodeposition so that the thickness of the coating film after drying was 30 μm, and heated for 20 minutes in an atmosphere at 140° C. A black colored base paint [trade name: AQUAREX AR2100 manufactured by Nippon Paint Co., Ltd.] was coated on the coating film thus formed so that the thickness of the coating film after drying was 10 μm, and heated for 10 minutes in an atmosphere at 80° C., to give a coated product A.

The surface of a polypropylene resin plate was washed to degrease, and a primer [product number: RB116 manufactured by NIPPON PAINT AUTOMOTIVE COATINGS CO., LTD.] was coated thereon so that the thickness of the coating film after drying was 10 μm, and heated for 10 minutes in an atmosphere at 80° C. A black colored base paint [product number: R301 manufactured by NIPPON PAINT AUTOMOTIVE COATINGS CO., LTD.] was coated on the coating film thus formed so that the thickness of the coating film after drying was 10 μm, and heated for 10 minutes in an atmosphere at 80° C., to give a coated product B.

(Producing a Test Piece)

The clear coating composition was coated on the surface of the coated product A or the coated product B shown in Table 1 so that the thickness of the coating film after drying was 30 μm, and heated for 20 minutes in an atmosphere at 100° C., to give a test piece.

The glass transition temperature of the functional group-containing (meth)acrylate-based polymer constituting the coating film was determined with this test piece by means of a thermomechanical analyzer [product number: TMA/SS-6000 manufactured by Seiko Instruments Inc.]. As a result, the glass transition temperature of the functional group-containing (meth)acrylate-based polymer was 40° C.

A. Glossy Feel

The coating film of the test piece thus obtained was visually observed, and evaluated in accordance with the following evaluation criteria.

(Evaluation Criteria)

⊚: Significantly strong gloss exists on the coating film.

○: Strong glossy feel exists on the coating film.

Δ: Weak glossy feel exists on the coating film.

x: Glossy feel does not exist on the coating film.

B. Colorability

The value of b* on the coating film of the test piece was determined by using an ultraviolet and visible spectrophotometer [product number: V-660 manufactured by JASCO Corporation]. Incidentally, the coating film is more colorless and more transparent as the value of b* is smaller.

Example I-2

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 75 parts by mass of benzyl methacrylate and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, the weight average molecular weight thereof was 6000, and the glass transition temperature of the coating film of the test piece produced in the same manner as in the above was 55° C.

A clear coating composition was obtained by mixing 100 parts by mass of the functional group-containing (meth) acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-3

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 15 parts by mass of 9-anthrylmethyl methacrylate, 60 parts by mass of styrene and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, and the weight average molecular weight thereof was 4000.

A clear coating composition was obtained by mixing 100 parts by mass of the functional group-containing (meth) acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-4

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 30 parts by mass of 9-anthrylmethyl methacrylate, 45 parts by mass of styrene and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, the weight average molecular weight thereof was 4500. The glass transition temperature of the coating film of the test piece produced in the same manner as in the above could not be determined, since the hardness thereof was so high.

A clear coating composition was obtained by mixing 100 parts by mass of the functional group-containing (meth) acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-5

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 55 parts by mass of 9-anthrylmethyl methacrylate, 20 parts by mass of benzyl methacrylate and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 121 mgKOH/g, the weight average molecular weight thereof was 5000. The glass transition temperature of the coating film of the test piece produced in the same manner as in the above could not be determined, since the hardness thereof was so high.

A clear coating composition was obtained by mixing 100 parts by mass of the functional group-containing (meth) acrylate-based polymer thus obtained with 0.5 part by mass of dibutyltin dilaurate and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-6

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 25 parts by mass of NFM, 50 parts by mass of styrene and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, the weight average molecular weight thereof was 6500. The glass transition temperature of the coating film of the test piece produced in the same manner as in the above. As a result, the glass transition temperature was 75° C.

A clear coating composition was obtained by mixing 100 parts by mass of the functional group-containing (meth) acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-7

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 75 parts by mass of NFM and 25 parts by mass of 2-hydroxyethyl acrylate thus obtained were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, the weight average molecular weight thereof was 6200. The glass transition temperature of the coating film of the test piece produced in the same manner as in the above. As a result, the glass transition temperature was 90° C.

A clear coating composition was obtained by mixing 100 parts by mass of the functional group-containing (meth) acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-8

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 75 parts by mass of NFM and 25 parts by mass of 4-hydroxybutyl acrylate were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 121 mgKOH/g, the weight average molecular weight thereof was 6000. The glass transition temperature of the coating film of the test piece produced in the same manner as in the above. As a result, the glass transition temperature was 80° C.

A clear coating composition was obtained by mixing 100 parts by mass of the functional group-containing (meth) acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-9

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 15 parts by mass of 9-anthrylmethyl methacrylate, 60 parts by mass of benzyl methacrylate, 10 parts by mass of n-butyl methacrylate and 15 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 72 mgKOH/g, the weight average molecular weight thereof was 5500. The glass transition temperature of the coating film of the test piece produced in the same manner as in the above could not be determined, since the hardness thereof was so high.

A clear coating composition was obtained by mixing 100 parts by mass of the functional group-containing (meth) acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-10

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 30 parts by mass of 9-anthrylmethyl methacrylate, 20 parts by mass of benzyl methacrylate, 20 parts by mass of n-butyl methacrylate and 30 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 145 mgKOH/g, the weight average molecular weight thereof was 5500. The glass transition temperature of the coating film of the test piece produced in the same manner as in the above could not be determined, since the hardness thereof was so high.

A clear coating composition was obtained by mixing 100 parts by mass of the functional group-containing (meth) acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-11

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 15 parts by mass of 9-anthrylmethyl methacrylate, 60 parts by mass of styrene and 25 parts by mass of glycidyl methacrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having epoxy group as a functional group. The weight per epoxy equivalent of the functional group-containing (meth)acrylate-based polymer thus obtained was 570 g/equivalent, and the weight average molecular weight thereof was 4900.

A clear coating composition was obtained by mixing 100 parts by mass of the functional group-containing (meth) acrylate-based polymer thus obtained with 1 part by mass of dimethylbenzylamine, and mixing adipic acid therewith so that the molar ratio of the total amount (moles) of the functional group of the functional group-containing (meth) acrylate-based polymer to the total amount (moles) of the functional group of adipic acid was 1:1.

The refractive index, glossy feel and colorability as the physical properties of the clear coating composition thus obtained were evaluated in the same manner as in Example I-1. The results thereof are shown in Table 1.

Example I-12

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 50 parts by mass of benzyl methacrylate, 40 parts by mass of butyl methacrylate and 10 parts by mass of methacrylic acid were added to the reaction vessel dropwise over 3 hours. After the dropwise addition was completed, the ingredients in the reaction vessel was maintained at 80° C. for 4 hours, to obtain a functional group-containing (meth)acrylate-based polymer having carboxyl group as a functional group. The acid value of the functional group-containing (meth)acrylate-based polymer thus obtained was 20 mgKOH/g, and the weight average molecular weight thereof was 6300.

A clear coating composition was obtained by mixing 100 parts by mass of the functional group-containing (meth) acrylate-based polymer thus obtained with 1 part by mass of dimethylbenzylamine, and mixing a bifunctional reactive epoxy resin [trade name: ADEKA GLYCIROL ED-503 manufactured by ADEKA CORPORATION] therewith so that the molar ratio of the total amount (moles) of the functional group of the functional group-containing (meth) acrylate-based polymer to the total amount (moles) of the functional group of the bifunctional reactive epoxy resin [trade name: ADEKA GLYCIROL ED-503 manufactured by ADEKA CORPORATION] was 1:1.

The refractive index, glossy feel and colorability as the physical properties of the clear coating composition thus obtained were evaluated in the same manner as in Example I-1. The results thereof are shown in Table 1.

Example I-13

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 20 parts by mass of polyethylene glycol monomethacrylate [trade names: MA-50A manufactured by NIPPON NYUKAZAI CO., LTD.] and 80 parts by mass of NFM were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 35 mgKOH/g, and the weight average molecular weight thereof was 6000.

A clear coating composition was obtained by mixing 100 parts by mass of the functional group-containing (meth) acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-14

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 75 parts by mass of NFM and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 121 mgKOH/g, the weight average molecular weight thereof was 6200, and the glass transition temperature of the coating film of the test piece produced in the same manner as in the above. As a result, the glass transition temperature was 90° C.

A clear coating composition was obtained by mixing 100 parts by mass of the functional group-containing (meth) acrylate-based polymer thus obtained with 20 parts by mass of methyl ethyl ketone dispersion of zirconia filler (average particle diameter of zirconia filler: 10 nm, content of zirconia filler: 30% by mass) and 0.5 part by mass of dibutyltin dilaurate, and mixing hexamethylene diisocyanate therewith so that the molar ratio of the total amount (moles) of the functional group of the functional group-containing (meth) acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-15

A reaction vessel equipped with a stirrer, a nitrogen gas inlet tube, a cooling tube, a thermometer and a dropping funnel for continuous dropping was charged with 230 parts by mass of cyclopentanone, and the temperature thereof was raised to 80° C. while stirring the cyclopentanone, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 30 parts by mass of 9-anthrylmethyl methacrylate, 45 parts by mass of styrene and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, the weight average molecular weight thereof was 4500. The glass transition temperature of the coating film of the test piece produced in the same manner as in the above could not be determined, since the hardness thereof was so high.

A clear coating composition was obtained by mixing 100 parts by mass of the functional group-containing (meth) acrylate-based polymer thus obtained with 0.5 part by mass of dibutyltin dilaurate and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-16

A reaction vessel equipped with a stirrer, a nitrogen gas inlet tube, a cooling tube, a thermometer and a dropping funnel for continuous dropping was charged with 230 parts by mass of cyclopentanone, and the temperature thereof was raised to 80° C. while stirring the cyclopentanone, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 55 parts by mass of 9-anthrylmethyl methacrylate, 20 parts by mass of benzyl methacrylate and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, the weight average molecular weight thereof was 5000. The glass transition temperature of the coating film of the test piece produced in the same manner as in the above could not be determined, since the hardness thereof was so high.

A clear coating composition was obtained by mixing 100 parts by mass of the functional group-containing (meth)acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-17

A reaction vessel equipped with a stirrer, a nitrogen gas inlet tube, a cooling tube, a thermometer and a dropping funnel for continuous dropping was charged with 230 parts by mass of cyclopentanone, and the temperature thereof was raised to 80° C. while stirring the cyclopentanone, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 75 parts by mass of NFM and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, the weight average molecular weight thereof was 6200, and the glass transition temperature of the coating film of the test piece produced in the same manner as in the above. As a result, the glass transition temperature was 90° C.

A clear coating composition was obtained by mixing 100 parts by mass of the functional group-containing (meth)acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-18

A reaction vessel equipped with a stirrer, a nitrogen gas inlet tube, a cooling tube, a thermometer and a dropping funnel for continuous dropping was charged with 230 parts by mass of cyclopentanone, and the temperature thereof was raised to 80° C. while stirring the cyclopentanone, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 75 parts by mass of NFM and 25 parts by mass of 4-hydroxybutyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, the weight average molecular weight thereof was 6000, and the glass transition temperature of the coating film of the test piece produced in the same manner as in the above was determined. As a result, the glass transition temperature 80° C.

A clear coating composition was obtained by mixing 100 parts by mass of the functional group-containing (meth)acrylate-based polymer thus obtained with 0.5 part by mass of dibutyltin dilaurate, and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-19

A reaction vessel equipped with a stirrer, a nitrogen gas inlet tube, a cooling tube, a thermometer and a dropping funnel for continuous dropping was charged with 230 parts by mass of cyclopentanone, and the temperature thereof was raised to 80° C. while stirring the cyclopentanone, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 20 parts by mass of polyethylene glycol monomethacrylate [trade names: MA-50A manufactured by NIPPON NYUKAZAI CO., LTD.] and 80 parts by mass of NFM were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 35 mgKOH/g, and the weight average molecular weight thereof was 6000.

A clear coating composition was obtained by mixing 100 parts by mass of the functional group-containing (meth) acrylate-based polymer thus obtained with 0.5 part by mass of dibutyltin dilaurate and mixing hexamethylene diisocyanate therewith so that the molar ratio of the total amount (moles) of the functional group of the functional group-containing (meth)acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Example I-20

A reaction vessel equipped with a stirrer, a nitrogen gas inlet tube, a cooling tube, a thermometer and a dropping funnel for continuous dropping was charged with 230 parts by mass of cyclopentanone, and the temperature thereof was raised to 80° C. while stirring the cyclopentanone, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 75 parts by mass of NFM and 25 parts by mass of 2-hydroxyethyl acrylate thus obtained were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g, the weight average molecular weight thereof was 6200, and the glass transition temperature of the coating film of the test piece produced in the same manner as in the above was determined. As a result, the glass transition temperature was 90° C.

A clear coating composition was obtained by mixing 100 parts by mass of the functional group-containing (meth) acrylate-based polymer thus obtained with 20 parts by mass of methyl ethyl ketone dispersion of zirconia filler (average particle diameter of zirconia filler: 10 nm, content of zirconia filler: 30% by mass) and 0.5 part by mass of dibutyltin dilaurate, and mixing hexamethylene diisocyanate therewith so that the molar ratio of the total amount (moles) of the functional group of the functional group-containing (meth) acrylate-based polymer to the total amount (moles) of the functional group of hexamethylene diisocyanate was 1:1.

The refractive index, glossy feel and colorability as the physical properties of the clear coating composition thus obtained were evaluated in the same manner as in Example I-1. The results thereof are shown in Table 1.

Comparative Example I-1

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 7 parts by mass of benzyl methacrylate, 70 parts by mass of n-butyl methacrylate and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 121 mgKOH/g.

A clear coating composition was obtained by dispersing 30 parts by mass of fine metal particles [trade name: NanoUse OZ-30M manufactured by NISSAN CHEMICAL INDUSTRIES, LTD.] in 100 parts by mass of the functional group-containing (meth)acrylate-based polymer thus obtained.

The refractive index, glossy feel and colorability as the physical properties of the clear coating composition thus obtained were evaluated in the same manner as in Example I-1. The results thereof are shown in Table 1.

Comparative Example I-2

A reaction vessel equipped with a stirrer, a nitrogen gas inlet tube, a cooling tube, a thermometer and a dropping funnel for continuous dropping was charged with 230 parts by mass of cyclopentanone, and the temperature thereof was raised to 80° C. while stirring the cyclopentanone, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 7 parts by mass of benzyl methacrylate, 70 parts by mass of n-butyl methacrylate and 25 parts by mass of 2-hydroxyethyl acrylate were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 1.21 mgKOH/g.

A clear coating composition was obtained by dispersing 30 parts by mass of fine metal particles [trade name: NanoUse OZ-30M manufactured by NISSAN CHEMICAL INDUSTRIES, LTD.] in 100 parts by mass of the functional group-containing (meth)acrylate-based polymer thus obtained.

The refractive index, glossy feel and colorability as the physical properties of the clear coating composition thus obtained were evaluated in the same manner as in Example I-1. The results thereof are shown in Table 1.

TABLE 1

| Number of Example and Comparative Example | Kind of coated product | Properties of clear coating composition | | |
|---|---|---|---|---|
| | | Refractive index (—) | Glossy feel | Colorability |
| Example I-1 | A | 1.500 | ○ | 2.5 |
| Example I-2 | A | 1.531 | ○ | 3.0 |
| Example I-3 | A | 1.558 | ○ | 6.0 |
| Example I-4 | A | 1.583 | ○ | 9.0 |
| Example I-5 | A | 1.609 | ○ | 10.0 |
| Example I-6 | B | 1.556 | ◉ | 3.5 |
| Example I-7 | B | 1.586 | ◉ | 4.2 |
| Example I-8 | B | 1.591 | ◉ | 4.1 |
| Example I-9 | B | 1.540 | ○ | 6.5 |
| Example I-10 | B | 1.539 | ○ | 9.0 |

TABLE 1-continued

| Number of Example and Comparative Example | Kind of coated product | Properties of clear coating composition | | |
|---|---|---|---|---|
| | | Refractive index (—) | Glossy feel | Colorability |
| Example I-11 | A | 1.560 | ○ | 6.1 |
| Example I-12 | A | 1.510 | ○ | 3.5 |
| Example I-13 | A | 1.579 | ⊚ | 4.0 |
| Example I-14 | B | 1.600 | ○ | 4.3 |
| Example I-15 | A | 1.583 | ○ | 9.0 |
| Example I-16 | A | 1.609 | ○ | 10.0 |
| Example I-17 | B | 1.586 | ⊚ | 4.2 |
| Example I-18 | B | 1.591 | ⊚ | 4.1 |
| Example I-19 | A | 1.579 | ⊚ | 4.0 |
| Example I-20 | B | 1.600 | ○ | 4.3 |
| Comp. Ex. I-1 | A | ✕ | X | ✕ |
| Comp. Ex. I-2 | A | ✕ | X | ✕ |

(Note)
✕: Determination could not be carried out, because a formed coating film was turbid.

From the above results, it can be seen that the clear coating composition obtained in each Example exhibits low colorability, has a high refractive index without use of a filler, exhibits excellent glossy feel even in the case of using a filler, and can be coated into a thick film. In addition, in each Example, it can be seen that the clear coating composition exhibits excellent glossy feel even in the case of using a filler, and can be coated into a thick film, and the refractive index of the coating film can be increased when a filler is used.

Examples of the Second Aspect of the Present Invention

Next, the second aspect of the present invention will be described in more detail with reference to working examples, and the present invention is not limited only to the examples.

Producing Example 1

An intermediate paint [trade name: ORGA P-5U manufactured by Nippon Paint Co., Ltd.] was coated on a steel plate previously subjected to cationic electrodeposition so that the thickness of the coating film after drying was 30 μm, and heated for 20 minutes in an atmosphere at 140° C. A black colored base paint [trade name: AQUAREX AR2100 manufactured by Nippon Paint Co., Ltd.] was coated on the coating film thus formed so that the thickness of the coating film after drying was 10 μm, and heated for 10 minutes in an atmosphere at 80° C., to give a coated product A.

Producing Example 2

The surface of a polypropylene resin plate was washed to degrease, a primer ([product number: RB116 manufactured by NIPPON PAINT AUTOMOTIVE COATINGS CO., LTD.] was coated thereon so that the thickness of the coating film after drying was 10 μm, and heated for 10 minutes in an atmosphere at 80° C. A black colored base paint [product number: R301 manufactured by NIPPON PAINT AUTOMOTIVE COATINGS CO., LTD.] was coated on the coating film thus formed so that the thickness of the coating film after drying was 10 μm, and heated for 10 minutes in an atmosphere at 80° C., to give a coated product B.

Example II-1

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 10 parts by mass of 2-hydroxyethyl acrylate and 90 parts by mass of a fluorine atom-containing monomer [trade name: Viscoat 3FM manufactured by Osaka Organic Chemical Industry Ltd., a fluorine atom-containing monomer represented by the formula (II) in which $R^1$ represents a methyl group and $R^3$ represents an alkyl group of 2 carbon atoms having 3 fluorine atoms] were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 10 mgKOH/g, and the weight average molecular weight thereof was 6000.

Incidentally, the hydroxyl value, acid value, weight per epoxy equivalent and weight average molecular weight of the functional group-containing (meth)acrylate-based polymer were measured by the following methods:

[Hydroxyl Value]
The hydroxyl value was determined in accordance with JIS-K 1557.

[Acid Value]
The acid value was determined in accordance with JIS-K 5601.

[Weight Per Epoxy Equivalent]
The weight per epoxy equivalent was determined in accordance with JIS-K 7147.

[Weight Average Molecular Weight]
The weight average molecular weight was determined by gel permeation chromatography [product number: HLC-8320GPC manufactured by Tosoh Corporation] using tetra hydrofuran as a developing solvent.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

The clear coating composition thus obtained was coated on the coated product A or the coated product B thus obtained so that the thickness thereof after drying was 30 μm, and the film having a coating film formed was dried by placing in a thermostatic chamber at 100° C. for 20 minutes, to give a test piece. The transparency, deep feel, and the hardness and durability of the coating film as the physical properties of the clear coating composition were evaluated in accordance with the following methods by using the test piece thus obtained. The results thereof are shown in Table 2.

(1) Transparency
The transparency of the coating film of the test piece was visually observed, and the transparency was evaluated in accordance with the following evaluation criteria.

(Evaluation Criteria)
⊚: Coating film is transparent.
○: Coating film is slightly colored white but transparent.
Δ: Coating film is colored white a little, and transparent.
x: Coating film is colored white and opaque.
(2) Deep Feel The coating film of the test piece was visually observed, and the deep feel was evaluated in accordance with the following evaluation criteria.
(EVALUATION CRITERIA)
⊚: Color of base looks clearly dark when coating film is looked at angle of 60 degree.
○: Color of base looks dark when coating film is looked at angle of 60 degree.
Δ: Color of base looks whitish due to luster when coating film is looked at angle of 60 degree.
x: Color of base looks white due to luster when coating film is looked at angle of 60 degree.
(2) Hardness of Coating Film The pencil hardness of the coating film formed on the surface of the coated product A was examined in accordance with JIS K 5600-5-4 "scratch hardness (pencil method)", and evaluated in accordance with the following evaluation criteria:
(Evaluation Criteria)
⊚: Pencil hardness is HB or higher.
○: Pencil hardness is 2B to B.
Δ: Pencil hardness is 4B to 3B.
x: Pencil hardness is 5B or lower.
(3) Durability of Coating Film The clear coating composition was coated on a glass plate having a width of 100 mm, a length of 100 mm and a thickness of 1 mm by a sprayer so that the thickness of the coating film after drying was 20 μm, and dried for 1 hour at 120° C., to give a test plate.

Next, the test plate was irradiated with ultraviolet light (irradiation dose: 255 W/m$^2$, wavelength: 300 to 700 nm) from the coating film side for 1000 hours by the Sunshine Weather Meter [product number: S80HB manufactured by Suga Test Instruments Co., Ltd.].

[Appearance]

The state of the glass surface of the test plate after irradiating with ultraviolet light was visually observed, and evaluated in accordance with the following evaluation criteria:
(Evaluation Criteria)
⊚: No change in appearance of a test plate after irradiating with ultraviolet light is observed as compared with a test plate before irradiation.
x: Turbidity in appearance of a test plate after irradiating with ultraviolet light is observed as compared with a test plate before irradiation.

[Optical Transparency]

The total transmittance on the glass surface of the test plate before and after irradiating with ultraviolet light was determined by means of a haze meter [product number: HM-150 manufactured by Murakami Color Research Laboratory], and a rate of decrease in total transmittance was determined by the equation:

[Rate of decrease in total transmittance(%)]=[[100−total transmittance(%) after ultraviolet irradiation]÷[total transmittance(%) before ultraviolet irradiation]]×100, and the optical transparency was evaluated in accordance with the following evaluation criteria:

(Evaluation Criteria)
⊚: Rate of decrease in total transmittance is less than 10%.
○: Rate of decrease in the total transmittance is 10% or more and less than 20%.
Δ: Rate of decrease in the total transmittance is 20% or more and less than 30%.
x: Rate of decrease in total transmittance is 40% or more.

Example II-2

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 10 parts by mass of 2-hydroxyethyl acrylate and 90 parts by mass of a fluorine atom-containing monomer [trade name: Viscoat 3F manufactured by Osaka Organic Chemical Industry Ltd., a fluorine atom-containing monomer represented by the formula (II) in which $R^1$ represents hydrogen atom and $R^3$ represents an alkyl group of 2 carbon atoms having 3 fluorine atoms] were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 10 mgKOH/g, and the weight average molecular weight thereof was 6000.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

The clear coating composition thus obtained was coated on the coated product A or the coated product B thus obtained so that the thickness thereof after drying was 30 μm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Example II-3

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 10 parts by mass of 2-hydroxyethyl acrylate and 90 parts by mass of a fluorine atom-containing monomer [trade name: Viscoat 8F manufactured by Osaka Organic Chemical Industry Ltd., a fluorine atom-containing monomer represented by the formula (II) in which $R^1$ represents hydrogen atom and $R^3$ represents an alkyl group of 5 carbon atoms having 8 fluorine atoms] were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 10 mgKOH/g, and the weight average molecular weight thereof was 6000.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

The clear coating composition thus obtained was coated on the coated product A or the coated product B thus obtained so that the thickness thereof after drying was 30 µm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Example II-4

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 10 parts by mass of hydroxybutyl acrylate and 90 parts by mass of a fluorine atom-containing monomer [trade name: Viscoat 3FM manufactured by Osaka Organic Chemical Industry Ltd., a fluorine atom-containing monomer represented by the formula (II) in which $R^1$ represents a methyl group and $R^3$ represents an alkyl group of 2 carbon atoms having 3 fluorine atoms] were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 10 mgKOH/g, and the weight average molecular weight thereof was 6000.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

The clear coating composition thus obtained was coated on the coated product A or the coated product B thus obtained so that the thickness thereof after drying was 30 µm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Example II-5

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 10 parts by mass of hydroxybutyl acrylate and 90 parts by mass of a fluorine atom-containing monomer [trade name: Viscoat 3FM manufactured by Osaka Organic Chemical Industry Ltd., a fluorine atom-containing monomer represented by the formula (II) in which $R^1$ represents a methyl group and $R^3$ represents an alkyl group of 2 carbon atoms having 3 fluorine atoms] were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 10 mgKOH/g, and the weight average molecular weight thereof was 6000.

Next, 100 parts by mass of the functional group-containing (meth)acrylate-based polymer thus obtained was mixed with 0.5 part by mass of dibutyltin dilaurate, and a methylated melamine resin [product number: MW-30M manufactured by SANWA CHEMICAL CO., LTD.] was mixed therewith so that the molar ratio of the total amount (moles) of the functional group of the functional group-containing (meth)acrylate-based polymer to the total amount (moles) of the functional group of the methylated melamine resin was 1:1, to obtain a clear coating composition.

The clear coating composition thus obtained was coated on the coated product A or the coated product B thus obtained so that the thickness thereof after drying was 30 µm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Example II-6

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 10 parts by mass of glycidyl acrylate and 90 parts by mass of a fluorine atom-containing monomer [trade name: Viscoat 3FM manufactured by Osaka Organic Chemical Industry Ltd., a fluorine atom-containing monomer represented by the formula (II) in which $R^1$ represents a methyl group and $R^3$ represents an alkyl group of 2 carbon atoms having 3 fluorine atoms] were added to the reaction vessel dropwise over 3 hours. After the dropwise addition was completed, the ingredients in the reaction vessel was maintained at 80° C. for 4 hours, to obtain a functional group-containing (meth)acrylate-based polymer having epoxy group as a functional group. The weight per epoxy equivalent of the functional group-containing (meth)acrylate-based polymer thus obtained was 4700 g/equivalent, and the weight average molecular weight thereof was 6000.

Next, 100 parts by mass of the functional group-containing (meth)acrylate-based polymer thus obtained was mixed with 1.0 part by mass of dimethylbenzylamine, and adipic acid was mixed therewith so that the molar ratio of the total amount (moles) of the functional group of the functional group-containing (meth)acrylate-based polymer to the total amount (moles) of the functional group of adipic acid was 1:1, to obtain a clear coating composition.

The clear coating composition thus obtained was coated on the coated product A or the coated product B thus obtained so that the thickness thereof after drying was 30 μm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Example II-7

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 10 parts by mass of methacrylic acid and 90 parts by mass of a fluorine atom-containing monomer [trade name: Viscoat 3FM manufactured by Osaka Organic Chemical Industry Ltd., a fluorine atom-containing monomer represented by the formula (II) in which $R^1$ represents a methyl group and $R^3$ represents an alkyl group of 2 carbon atoms having 3 fluorine atoms] were added to the reaction vessel dropwise over 3 hours. After the dropwise addition was completed, the ingredients in the reaction vessel was maintained at 80° C. for 4 hours, to obtain a functional group-containing (meth) acrylate-based polymer having carboxyl group as a functional group. The acid value of the functional group-containing (meth)acrylate-based polymer thus obtained was 20 mgKOH/g, and the weight average molecular weight thereof was 6000.

Next, 100 parts by mass of the functional group-containing (meth)acrylate-based polymer thus obtained was mixed with 1.0 part by mass of dimethylbenzylamine, and a bifunctional reactive epoxy resin [trade name: ADEKA GLYCIROL ED-503 manufactured by ADEKA CORPORATION] therewith so that the molar ratio of the total amount (moles) of the functional group of the functional group-containing (meth)acrylate-based polymer to the total amount (moles) of the functional group of the bifunctional reactive epoxy resin [trade name: ADEKA GLYCIROL ED-503 manufactured by ADEKA CORPORATION] was 1:1, to obtain a clear coating composition.

The clear coating composition thus obtained was coated on the coated product A or the coated product B thus obtained so that the thickness thereof after drying was 30 μm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Example II-8

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 5 parts by mass of 2-hydroxyethyl methacrylate and 95 parts by mass of a fluorine atom-containing monomer [trade name: Viscoat 3FM manufactured by Osaka Organic Chemical Industry Ltd., a fluorine atom-containing monomer represented by the formula (II) in which $R^1$ represents a methyl group and $R^3$ represents an alkyl group of 2 carbon atoms having 3 fluorine atoms] were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth)acrylate-based polymer thus obtained was 5 mgKOH/g, and the weight average molecular weight thereof was 6000.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

The clear coating composition thus obtained was coated on the coated product A or the coated product B thus obtained so that the thickness thereof after drying was 30 μm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Example II-9

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 20 parts by mass of hydroxybutyl acrylate and 80 parts by mass of a fluorine atom-containing monomer [trade name: Viscoat 3FM manufactured by Osaka Organic Chemical Industry Ltd., a fluorine atom-containing monomer represented by the formula (II) in which $R^1$ represents a methyl group and $R^3$ represents an alkyl group of 2 carbon atoms having 3 fluorine atoms] were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 20 mgKOH/g, and the weight average molecular weight thereof was 6000.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

The clear coating composition thus obtained was coated on the coated product A or the coated product B thus obtained so that the thickness thereof after drying was 30 µm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Example II-10

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 20 parts by mass of polyethylene glycol monomethacrylate [trade names: MA-50A manufactured by NIPPON NYUKAZAI CO., LTD.] and 80 parts by mass of a fluorine atom-containing monomer [trade name: Viscoat 3FM manufactured by Osaka Organic Chemical Industry Ltd., a fluorine atom-containing monomer represented by the formula (II) in which $R^1$ represents a methyl group and $R^3$ represents an alkyl group of 2 carbon atoms having 3 fluorine atoms] were added to the reaction vessel dropwise over 3 hours. After the dropwise addition was completed, the ingredients in the reaction vessel was maintained at 80° C. for 4 hours, to obtain a functional group-containing (meth)acrylate-based polymer having hydroxyl group as a functional group. The hydroxyl value of the functional group-containing (meth) acrylate-based polymer thus obtained was 35 mgKOH/g, and the weight average molecular weight thereof was 6000.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

The clear coating composition thus obtained was coated on the coated product A or the coated product B thus obtained so that the thickness thereof after drying was 30 µm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Comparative Example II-1

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 10 parts by mass of 2-hydroxyethyl acrylate and 90 parts by mass of a fluorine atom-containing monomer [trade name: Viscoat 13F manufactured by Osaka Organic Chemical Industry Ltd., a fluorine atom-containing monomer represented by the formula (II) in which $R^1$ represents hydrogen atom and R-represents an alkyl group of 8 carbon atoms having 13 fluorine atoms] were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 10 mgKOH/g, and the weight average molecular weight thereof was 6000.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

The clear coating composition thus obtained was coated on the coated product A or the coated product B thus obtained so that the thickness thereof after drying was 30 µm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Comparative Example II-2

A reaction vessel equipped with a stirrer, a nitrogen gas inlet tube, a cooling tube, a thermometer and a dropping funnel for continuous dropping was charged with 230 parts by mass of butyl acetate, and the temperature thereof was raised to 80° C. while stirring the butyl acetate, and introducing nitrogen gas to the reaction vessel.

Next, 10 parts by mass of azobisisobutyronitrile was added to the reaction vessel while maintaining the temperature at 80° C., and the azobisisobutyronitrile was dissolved in the ingredients in the reaction vessel. Thereafter, 10 parts by mass of 2-hydroxyethyl acrylate and 90 parts by mass of a fluorine atom-containing monomer [trade name: Viscoat 17F manufactured by Osaka Organic Chemical Industry Ltd., a fluorine atom-containing monomer represented by the formula (II) in which $R^1$ represents hydrogen atom and $R^3$ represents an alkyl group of 10 carbon atoms having 17 fluorine atoms] were added to the reaction vessel dropwise over 3 hours. After the dropwise addition was completed, the ingredients in the reaction vessel was maintained at 80° C. for 4 hours, to obtain a functional group-containing (meth) acrylate-based polymer having hydroxyl group as a functional group. The hydroxyl value of the functional group-containing (meth)acrylate-based polymer thus obtained was 10 mgKOH/g, and the weight average molecular weight thereof was 6000.

Next, 100 parts by mass of the functional group-containing (meth)acrylate-based polymer thus obtained was mixed with 0.5 part by mass of dibutyltin dilaurate, and hexamethylene diisocyanate was mixed therewith so that the molar ratio of the total amount (moles) of the functional group of the functional group-containing (meth)acrylate-based polymer to the total amount (moles) of the functional group of hexamethylene diisocyanate was 1:1, to obtain a clear coating composition.

The clear coating composition thus obtained was coated on the coated product A or the coated product B thus obtained so that the thickness thereof after drying was 30 µm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Comparative Example II-3

As a paint of the prior art, an acid epoxy-based paint composed of a styrene-acrylic acid copolymer and hydrogenated bisphenol A was used.

The acid epoxy-based paint was coated on the coated product A or the coated product B thus obtained so that the thickness thereof after drying was 30 µm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

Comparative Example II-4

As a paint of the prior art, a urethane-based paint composed of a styrene-acrylic acid-2-hydroxyethyl copolymer and hexamethylene diisocyanate was used.

The urethane-based paint was coated on the coated product A or the coated product B thus obtained so that the thickness thereof after drying was 30 µm, and the film having a coating film formed was dried by placing in a thermostatic chamber at 100° C. for 20 minutes, to give a test piece. The physical properties of the clear coating composition were evaluated in the same manner as in Example II-1 by using the test piece thus obtained. The results thereof are shown in Table 2.

TABLE 2

| Number of Example and Comparative Example | Kind of coated product | Physical properties of clear coating composition | | | | |
|---|---|---|---|---|---|---|
| | | | | Hardness | Durability of coating film | |
| | | Transparency | Deep feel | of coating film | Appearance | Optical transparency |
| Ex. II-1 | A | ⊚ | ⊚ | ⊚ | ⊚ | ⊚ |
| | B | ⊚ | ⊚ | — | ⊚ | ⊚ |
| Ex. II-2 | A | ⊚ | ⊚ | ○ | ⊚ | ⊚ |
| | B | ⊚ | ⊚ | — | ⊚ | ⊚ |
| Ex. II-3 | A | ⊚ | ⊚ | ○ | ⊚ | ○ |
| | B | ⊚ | ⊚ | — | ⊚ | ○ |
| Ex. II-4 | A | ⊚ | ⊚ | ⊚ | ⊚ | ⊚ |
| | B | ⊚ | ⊚ | — | ⊚ | ⊚ |
| Ex. II-5 | A | ⊚ | ⊚ | ⊚ | ⊚ | ⊚ |
| | B | ⊚ | ⊚ | — | ⊚ | ⊚ |
| Ex. II-6 | A | ⊚ | ⊚ | ⊚ | ⊚ | ⊚ |
| | B | ⊚ | ⊚ | — | ⊚ | ⊚ |
| Ex. II-7 | A | ⊚ | ⊚ | ⊚ | ⊚ | ⊚ |
| | B | ⊚ | ⊚ | — | ⊚ | ⊚ |
| Ex. II-8 | A | ⊚ | ⊚ | ⊚ | ⊚ | ⊚ |
| | B | ⊚ | ⊚ | — | ⊚ | ⊚ |

TABLE 2-continued

Physical properties of clear coating composition

| Number of Example and Comparative Example | Kind of coated product | Transparency | Deep feel | Hardness of coating film | Durability of coating film Appearance | Optical transparency |
|---|---|---|---|---|---|---|
| Ex. II-9 | A | ◎ | ◎ | ◎ | ◎ | ◎ |
|  | B | ◎ | ◎ | — | ◎ | ◎ |
| Ex. II-10 | A | ◎ | ◎ | ○ | ◎ | ◎ |
|  | B | ◎ | ◎ | — | ◎ | ◎ |
| Comp. Ex. II-1 | A | △ | △ | X | X | X |
|  | B | △ | △ | — | X | X |
| Comp. Ex. II-2 | A | X | △ | X | X | X |
|  | B | X | △ | — | X | X |
| Comp. Ex. II-3 | A | ◎ | X | ◎ | ◎ | ◎ |
|  | B | ◎ | X | — | ◎ | ◎ |
| Comp. Ex. II-4 | A | ◎ | X | ◎ | ◎ | ◎ |
|  | B | ◎ | X | — | ◎ | ◎ |

From the results shown in Table 2, it can be seen that the clear coating composition obtained in each Example forms a coating film which exhibits excellent transparency and deep feel, which is hard, and which is excellent in durability.

INDUSTRIAL APPLICABILITY

The clear coating composition of the present invention is expected to be used, for example, for an article to be coated such as an outer plate of the body of a motor vehicle such as a passenger car, a truck, a motorcycle or a bus, a part of a motor vehicle, an electronic device, a mobile phone, and an outer plate of a household electric appliance such as an audio device, and among them, an article to be coated such as an outer plate of the body of a motor vehicle and a part of a motor vehicle.

The invention claimed is:

1. A clear coating composition used for a top coat, comprising:
    (A) a functional group-containing (meth)acrylate-based polymer made by the polymerization of a monomer component comprising an aromatic ring-containing (meth)acrylate and a functional group-containing monomer represented by the formula (I):

$$CH_2=\underset{R^1}{\underset{|}{C}}-R^2 \qquad (I)$$

wherein $R^1$ represents hydrogen atom or methyl group, and $R^2$ represents hydroxyl group, an alkyl group of 1 to 4 carbon atoms having hydroxyl group, carboxyl group, an alkyl group of 1 to 4 carbon atoms having carboxyl group, epoxy group, an alkyl group of 1 to 4 carbon atoms having epoxy group, a hydroxyalkyloxycarbonyl group having a hydroxyalkyl group of 1 to 4 carbon atoms or a group represented by the formula:

$$-\underset{O}{\underset{\|}{C}}-O-(CH_2CH_2O)_n-H$$

wherein n represents an integer of 3 to 20, and (B) a crosslinking agent,
    wherein said aromatic ring-containing (meth)acrylate is at least one member selected from the group consisting of naphthalene (meth)acrylate, anthranyl (meth)acrylate, phenanthryl (meth)acrylate and naphthalene-containing urethane-modified methacrylate.

2. The clear coating composition according to claim 1, further comprising a filler having an average particle diameter of 3 to 30 nm in an amount of 1 to 25 parts by mass per 100 parts by mass of the functional group-containing (meth)acrylate-based polymer.

3. A clear coating composition used for a top coat, comprising:
    (A) a functional group-containing (meth)acrylate-based polymer made by the polymerization of a monomer component comprising a functional group-containing monomer represented by the formula (I):

$$CH_2=\underset{R^1}{\underset{|}{C}}-R^2 \qquad (I)$$

wherein $R^1$ represents hydrogen atom or methyl group, and $R^2$ represents hydroxyl group, an alkyl group of 1 to 4 carbon atoms having hydroxyl group, carboxyl group, an alkyl group of 1 to 4 carbon atoms having carboxyl group, epoxy group, an alkyl group of 1 to 4 carbon atoms having epoxy group, a hydroxyalkyloxycarbonyl group having a hydroxyalkyl group of 1 to 4 carbon atoms or a group represented by the formula:

$$-\underset{O}{\underset{\|}{C}}-O-(CH_2CH_2O)_n-H$$

wherein n represents an integer of 3 to 20, and a fluorine atom-containing monomer represented by the formula (II):

$$CH_2=\underset{R^1}{\underset{|}{C}}-COOR^3 \qquad (II)$$

wherein $R^1$ is the same as the above, and $R^3$ represents an alkyl group of 2 carbon atoms having 3 fluorine atoms, and (B) a crosslinking agent, wherein the content of the functional group-containing monomer in the monomer component is 5 to 40% by mass, and the content of the fluorine atom-containing monomer in the monomer component is 60 to 95% by mass.

4. The clear coating composition according to claim 3, wherein the content of the functional group-containing monomer in the monomer component is 5 to 30% by mass, and the content of the fluorine atom-containing monomer in the monomer component is 70 to 95% by mass.

5. The clear coating composition according to claim 3, wherein the content of the functional group-containing monomer in the monomer component is 5 to 20% by mass, and the content of the fluorine atom-containing monomer in the monomer component is 80 to 95% by mass.

* * * * *